United States Patent
Heishi et al.

(10) Patent No.: US 10,392,209 B2
(45) Date of Patent: Aug. 27, 2019

(54) SHEET FEEDING SUB TRAY, SHEET CONVEYING DEVICE, IMAGE READING DEVICE, AND IMAGE FORMING APPARATUS

(71) Applicants: Fumiyuki Heishi, Kanagawa (JP); Joji Akiyama, Kanagawa (JP)

(72) Inventors: Fumiyuki Heishi, Kanagawa (JP); Joji Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/918,679

(22) Filed: Mar. 12, 2018

(65) Prior Publication Data
US 2018/0265313 A1    Sep. 20, 2018

(30) Foreign Application Priority Data
Mar. 15, 2017    (JP) .................. 2017-050622

(51) Int. Cl.
| B65H 1/26 | (2006.01) |
| H04N 1/00 | (2006.01) |
| G03G 15/00 | (2006.01) |

(52) U.S. Cl.
CPC .............. *B65H 1/266* (2013.01); *H04N 1/00* (2013.01); *B65H 2405/1142* (2013.01); *B65H 2405/12* (2013.01); *B65H 2405/31* (2013.01); *B65H 2405/332* (2013.01); *B65H 2405/36* (2013.01); *B65H 2701/1131* (2013.01); *B65H 2801/39* (2013.01); *G03G 15/602* (2013.01); *G03G 15/6508* (2013.01)

(58) Field of Classification Search
CPC .......... B65H 1/26; B65H 1/263; B65H 1/266; B65H 1/28; B65H 3/66; B65H 3/68; B65H 2405/1142; B65H 2405/31; B65H 2405/332; B65H 2405/36; B65H 2405/361; B65H 2701/1131
See application file for complete search history.

(56) References Cited

U.S. PATENT DOCUMENTS

| 5,120,040 A * | 6/1992 | Worley ..................... B65H 5/26 |
| | | 271/119 |
| 5,346,197 A * | 9/1994 | Takano ..................... B65H 1/04 |
| | | 271/127 |
| 5,484,141 A * | 1/1996 | Yamashita ............. B65H 9/006 |
| | | 271/227 |
| 7,731,179 B2 * | 6/2010 | Izuchi ..................... B41J 13/103 |
| | | 271/145 |
| 7,748,692 B2 * | 7/2010 | Shiohara .................. B65H 1/26 |
| | | 271/158 |

(Continued)

FOREIGN PATENT DOCUMENTS

| JP | 2001-139169 | 5/2001 |
| JP | 2002-205835 | 7/2002 |

*Primary Examiner* — Jeremy R Severson
(74) *Attorney, Agent, or Firm* — Duft & Bornsen, PC

(57) ABSTRACT

A sheet feeding sub tray is detachably attachable to a sheet loading stand of a sheet conveying device that includes a setting reference part on one end side of the sheet loading stand in a sheet width direction. The sheet feeding sub tray includes a small-size setting reference part disposed at a position closer to a center of the sheet loading stand in the sheet width direction than the setting reference part in a state in which the sheet feeding sub tray is installed to the sheet loading stand.

16 Claims, 15 Drawing Sheets

(56) References Cited

U.S. PATENT DOCUMENTS

| | | | |
|---|---|---|---|
| 8,714,539 B2* | 5/2014 | Kotaka | B65H 1/00 |
| | | | 271/3.14 |
| 8,827,267 B2* | 9/2014 | Hongo | B65H 3/063 |
| | | | 271/258.01 |
| 9,216,598 B2* | 12/2015 | Aoki | B41J 13/103 |
| 9,933,743 B2* | 4/2018 | Takahashi | G03G 15/6538 |
| 2013/0341856 A1* | 12/2013 | Takemasa | B65H 29/00 |
| | | | 271/220 |
| 2016/0170355 A1 | 6/2016 | Heishi et al. | |
| 2018/0222211 A1* | 8/2018 | Jariabka | B41J 3/36 |

* cited by examiner

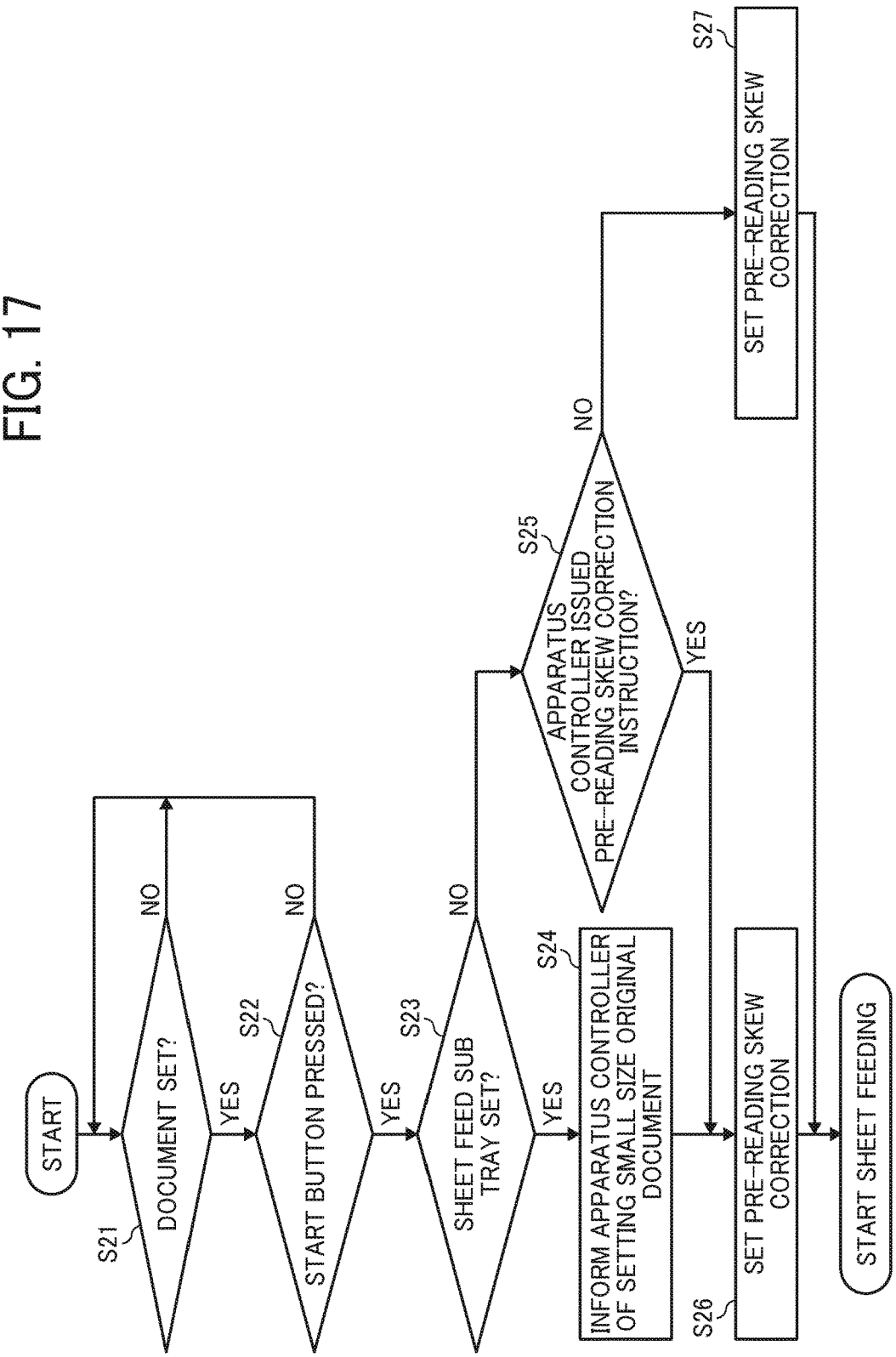

SHEET FEEDING SUB TRAY, SHEET CONVEYING DEVICE, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2017-050622, filed on Mar. 15, 2017, in the Japan Patent Office, the entire disclosure of which is incorporated by reference herein.

BACKGROUND

Technical Field

The present disclosure relates to a sheet feeding sub tray, a sheet feeding apparatus, an image reading device, and an image forming apparatus.

Description of the Related Art

Conventionally, a sheet conveying device such as an auto document feeder (ADF) is known in which a setting reference part is disposed on one-end side of a sheet loading stand in the sheet width direction, and a sheet such as a document set on the sheet loading stand abutting the setting reference part to be positioned and is conveyed. Such a sheet conveying device includes a sheet feeding roller such as a pickup roller conveying at least an uppermost sheet among a plurality of sheets set on the sheet loading stand toward a separation part. The sheet feeding roller, generally, has an axial-direction length to be smaller than a sheet width and is arranged such that the center of the sheet feeding roller in the sheet width direction is adjusted to the center of the width of a sheet of a size having a high use frequency so as to be able to stably convey a sheet of a size having a high use frequency (for example, A4 vertical).

It is known that a minimum size that can be conveyed by the sheet conveying device described above is a size A5.

In recent years, the number of requests for image reading of a sheet having a size A6 smaller than the size A5 and a sheet having the size of a check has been increased. However, for a sheet of such a size, when one end of the sheet in the width direction is set to butt the setting reference part of the sheet loading stand, the other end in the width direction does not reach a position facing the sheet feeding roller, and thus the sheet may not be conveyed.

SUMMARY

In an aspect of the present disclosure, there is provided a sheet feeding sub tray detachably attachable to a sheet loading stand of a sheet conveying device that includes a setting reference part on one end side of the sheet loading stand in a sheet width direction. The sheet feeding sub tray includes a small-size setting reference part disposed at a position closer to a center of the sheet loading stand in the sheet width direction than the setting reference part in a state in which the sheet feeding sub tray is installed to the sheet loading stand.

In another aspect of the present disclosure, there is provided a sheet conveying device that includes a sheet loading stand including a setting reference part on one end side in a sheet width direction. The above-described sheet feeding sub tray is attachable to the sheet loading stand.

In still another aspect of the present disclosure, there is provided an image reading device that includes the above-described sheet conveying device and a conveying document reader. The sheet conveying device conveys a document sheet having a document image on a front face. The conveying document reader reads the document image of the document sheet conveyed by the sheet conveying device.

In still yet another aspect of the present disclosure, there is provided an image forming apparatus that includes the above-described image reading device and an image forming device. The image reading device reads a document image. The image forming device forms an image based on the document image read by the image reading device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 17 is a flowchart of a skew operation according to a modified example.

Figure 1:
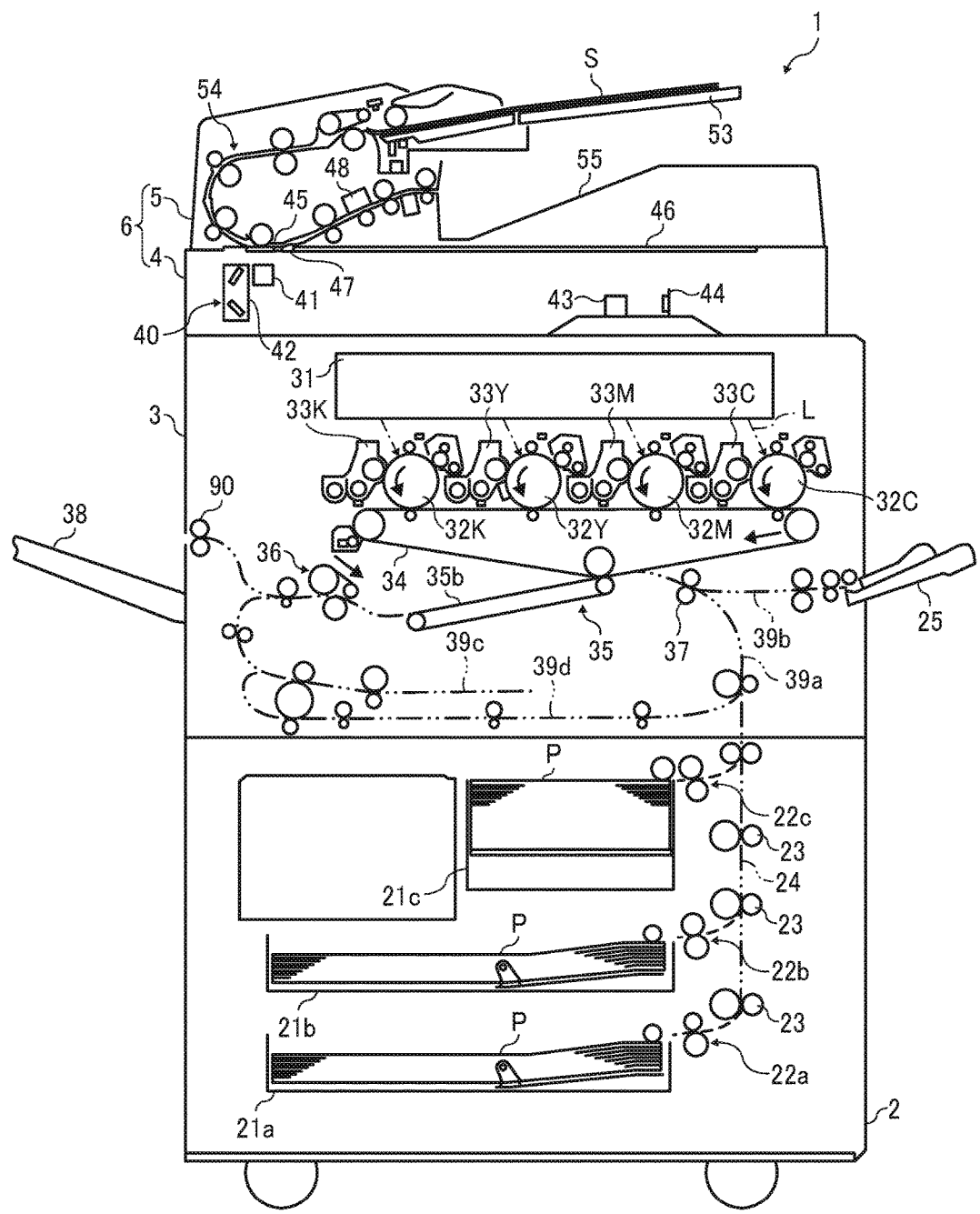
FIG. 1 is a schematic configuration diagram that illustrates a copier according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a copier of an electrophotography system (hereinafter, simply referred to as a copier 1) according to an embodiment of the present disclosure that is an image forming apparatus will be described.

First, a basic configuration of the copier 1 according to this embodiment will be described.

FIG. 1 is a schematic configuration diagram that illustrates the copier 1. The copier 1 includes an image forming unit 3 as an image forming device, a transfer sheet feeding unit 2, and a document feeding and reading unit 6. The document feeding and reading unit 6 as a document conveying and reading means includes a scanner 4 that is a document reading device fixed on the image forming unit 3 and an automatic document feeder 5 as a sheet conveying device supported by a scanner 4.

The transfer sheet feeding unit 2 includes transfer sheet feeding cassettes 21 (21a, 21b, and 21c) of a plurality of stages that can house transfer sheets P having a cut sheet shape in a stacking state. In each of the transfer sheet feeding cassettes 21 (21a, 21b, and 21c), for example, transfer sheets P (for example, white sheets) of a sheet size selected in advance from a plurality of sheet sizes are housed to be directed in a vertical or horizontal sheet feeding direction.

The transfer sheet feeding units 2 respectively include transfer sheet feeding devices 22 (22a, 22b, and 22c) that sequentially pick up transfer sheets P housed in the transfer sheet feeding cassettes 21 (21a, 21b, and 21c) from uppermost layer sides and separately feed the transfer sheets P. In addition, in the transfer sheet feeding unit 2, various rollers such as a transfer sheet conveying roller pair 23 are disposed. By using such various rollers, transfer sheet feeding paths 24 used for conveying transfer sheets P respectively fed from the transfer sheet feeding devices 22 (22a, 22b, and 22c) to a predetermined image forming position of the image forming unit 3 are formed.

The image forming unit 3 includes an exposure device 31 that is a latent image forming device and drum-shaped photoconductors 32 (32K, 32Y, 32M, and 32C) that are latent image bearers. In addition, the image forming unit 3 includes developing devices 33 (33K, 33Y, 33M, and 33C) in which toners of colors black (K), yellow (Y), magenta (M), and cyan (C) are filled. Furthermore, the image forming unit 3 includes an intermediate transfer belt 34 that is an intermediate transfer body, a secondary transfer device 35 that transfers a toner image disposed on the intermediate transfer belt 34 to a transfer sheet P, and a fixing device 36 that fixes the toner image to the transfer sheet P on which the toner image has been transferred.

The exposure device 31, for example, generates exposure laser beam L of each color on the basis of an image read by the scanner 4. In addition, the exposure device 31 exposes the photoconductors 32 (32K, 32Y, 32M, and 32C) of the colors using the laser beams L and form electrostatic latent images of the colors corresponding to the read image on the surfaces of the photoconductors 32 (32K, 32Y, 32M, and 32C).

The developing devices 33 (33K, 33Y, 33M, and 33C) cause toner in a thin-layer state to approach the facing photoconductors 32 (32K, 32Y, 32M, and 32C) and perform a phenomenon of developing by supplying toner to the electrostatic latent images disposed on the surfaces of the photoconductors 32 (32K, 32Y, 32M, and 32C).

In the image forming unit 3, the toner images developed on the photoconductors 32 (32K, 32Y, 32M, and 32C) are primarily transferred to the intermediate transfer belt 34 in an overlapping manner, whereby a color toner image is formed on the intermediate transfer belt 34. This color toner image is secondarily transferred from the intermediate transfer belt 34 to a transfer sheet P in a secondary transfer nip at which a transfer conveying belt 35b of the secondary transfer device 35 arranged below the intermediate transfer belt 34 and the intermediate transfer belt 34 are brought into contact with each other. The transfer sheet P on which the color toner image has been transferred is conveyed to the fixing device 36 by the transfer conveying belt 35b of the secondary transfer device 35. As the transfer sheet P is heated and pressurized by the fixing device 36, the color toner image on the transfer sheet P is melted, and the color toner image is fixed to the transfer sheet P, and a color image is recorded on the transfer sheet P.

The image forming unit 3 includes a transfer sheet conveying path 39a for conveying a transfer sheet P carried in from the transfer sheet feeding unit 2 through the transfer sheet feeding path 24 toward the secondary transfer nip. In this transfer sheet conveying path 39a, first, the conveying timing and the conveying speed of the transfer sheet P are adjusted by a registration roller pair 37. Then, in a state being synchronized with the belt speeds of the intermediate transfer belt 34 and the transfer conveying belt 35b, the transfer sheet P that has passed through the secondary transfer nip and the fixing device 36 is ejected onto a sheet ejection tray 38 by a sheet ejecting roller pair 90.

The image forming unit 3 includes a transfer sheet bypass feeding path 39b for feeding the transfer sheet P placed on a bypass tray 25 to the inside the transfer sheet conveying path 39a on a further upstream side than the registration roller pair 37.

Below the secondary transfer device 35 and the fixing device 36, a switchback conveying path 39c and a reverse conveying path 39d each including a plurality of conveying rollers, a conveying guide, and the like are arranged.

In a case in which images are to be formed on both faces of a transfer sheet P, the switchback conveying path 39c causes the transfer sheet P having an image fixed to one face out of two faces to enter from one end (a left end part in FIG. 1). Thereafter, switchback conveying for moving back (moving in a direction opposite to that at the time of entrance) is performed.

The reverse conveying path 39*d* inverts the front and rear sides of the transfer sheet P that has been switched back and conveyed using the switchback conveying path 39*c* and feed the transfer sheet P to the registration roller pair 37 again.

In accordance with the switchback conveying path 39*c* and the reverse conveying path 39*d*, the transfer sheet P having one face for which an image fixing process has been completed has the progress direction switched to a reverse direction and then has the front and rear sides inverted and enters the secondary transfer nip again. Then, after a secondary transfer process and a fixing process of an image is also performed for the other face out of two faces, the transfer sheet P is ejected onto the sheet ejection tray 38.

The scanner 4 includes: a first carriage 41 in which an illumination unit and a mirror member is mounted; a second carriage 42 in which a mirror member is mounted; an imaging forming lens 43; an imaging unit 44; and a first contact glass 45. These configure a first face reader 40 that reads an image of a first face of a document S conveyed on the first contact glass 45. The first face described here is one face of a document S that is automatically conveyed, for example, an image face of the front side. In addition, the scanner 4 includes a second contact glass 46 in which a document S is placed and an abutting member 47 performing abutting and positioning one side of the document S.

The first carriage 41 is disposed to be movable in the horizontal direction in FIG. 1 and be controllable in the position under the first contact glass 45 and the second contact glass 46. Then, illumination light from a light source included in the illumination unit is reflected on the mirror member to be emitted to the exposure face side of the document S.

Reflection light reflected on the exposure face of the document S is incident to the imaging forming lens 43 through the mirror members mounted in the first carriage 41 and the second carriage 42 and forms an image using the imaging forming lens 43. Then, the imaging unit 44 reads the formed image.

The scanner 4 is able to expose and scan an image face of a document S placed on the second contact glass 46 while moving the first carriage 41 and the second carriage 42, for example, at a speed ratio of "2:1" in a state in which the light source is turned on. Then, the scanner 4 can exert a fixed document reading function (so-called a flatbed scanner function) by reading a document image at the time of the exposing and scanning using the imaging unit 44.

The scanner 4 can stop the first carriage 41 to a set position right below the first contact glass 45. Then, the scanner 4 can exert a moving document reading function (so-called an ADF scanner function) of reading an image of the first face of a document S during automatic conveying without moving an optical system configured by a light source, a reflection mirror, and the like.

In addition, the copier 1 includes a second face reader 48 built in the automatic document feeder 5 in addition to the first face reader 40 of the scanner 4. The second face reader 48 scans the second face of a document S after passing through the upper side of the first contact glass 45, for example, an image face of the rear side.

The automatic document feeder 5 is connected to the scanner 4 fixed to an upper part of the image forming unit 3 of the copier 1 to be able to perform an opening/closing operation through a hinge mechanism. The automatic document feeder 5 is able to be rotated between an open position for exposing the first contact glass 45 and the second contact glass 46 of the scanner 4 and a closed position for covering the first contact glass 45 and the second contact glass 46.

Next, the automatic document feeder 5 will be described.

Figure 2:
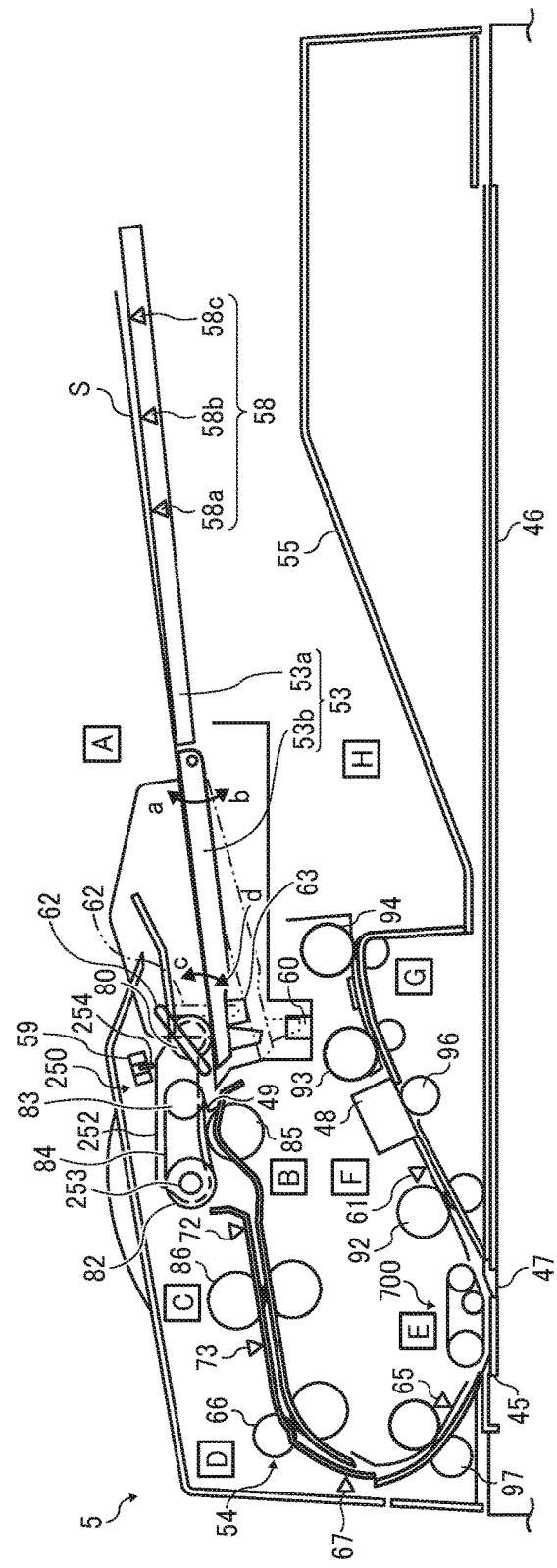
FIG. 2 is a schematic configuration diagram that illustrates an automatic document feeder according to an embodiment of the present disclosure, together with an upper part of a scanner.

FIG. 2 is an enlarged configuration diagram that illustrates a main configuration of the automatic document feeder 5 together with an upper part of the scanner 4. The automatic document feeder 5 includes a document setting unit A, a separation and feeding unit B, a registration unit C, a turn unit D, a first reading conveying unit E, a second reading conveying unit F, a sheet ejecting unit G, a stack unit H, and the like. The document conveying unit 54 of the automatic document feeder 5 according to this embodiment is a part that configures a path conveying a document S from a position detected by a document contact sensor 72 on the downstream side of the separation and feeding unit B to a reading entrance roller 97.

The automatic document feeder 5 is an automatic document conveying device of a sheet through type including a document sheet feeding port receiving a document S set on the document setting unit A inside the device and an ejection port ejecting the document S of which an image has been read to the stack unit H.

The document feeding and reading unit 6 including the automatic document feeder 5 conveys a document S that is a recording medium to be read to the first face reader 40 and the second face reader 48 that are fixed reading device units and performs image reading while conveying the document S at a predetermined speed.

The document setting unit A includes a document loading stand 53 in which a bundle of documents S are set such that the first faces of the documents S are on the upper side.

The separation and feeding unit B includes a pickup roller 80, a separation belt 84, a reverse roller 85, and the like and separates and feeds one document S from a bundle of documents S set on the document loading stand 53 each time.

The registration unit C has a role of matching a document S fed from the separation and feeding unit B through primary abutting and a role of drawing out and conveying the document S after matching.

The turn unit D includes a curved conveying path curved in the shape of "C" and turns a document S conveyed inside the curved conveying path to be returned and have the upper and lower sides inverted and conveys the document S such that the first face is directed toward the first face reader 40 (see FIG. 1) disposed on the lower side.

The first reading conveying unit E conveys the document S on the first contact glass 45 formed using platen glass. While conveying the document S, the first face reader 40 disposed inside the scanner 4 is caused to read an image of the first face of the document S from the lower side of the first contact glass 45.

The second reading conveying unit F causes the second face reader 48 to read an image of the second face of the document S while conveying the document S passing through the first reading conveying unit E using a second reader opposing roller 96 arranged below the second face reader 48.

The sheet ejecting unit G ejects the document S that has passed through the second reading conveying unit F toward the stack unit H disposed outside the device.

The stack unit H loads and holds the document S after the completion of reading on a document stack stand 55.

The automatic document feeder 5 includes a document feed section 250. The document feed section 250 includes a pickup bracket 252, a document sheet feeding unit driving axis 253, a bracket detection target part 254, a pickup roller 80, a sheet feeding driving roller 82, a feeding driven roller 83, the separation belt 84, and the reverse roller 85.

Figure 3:
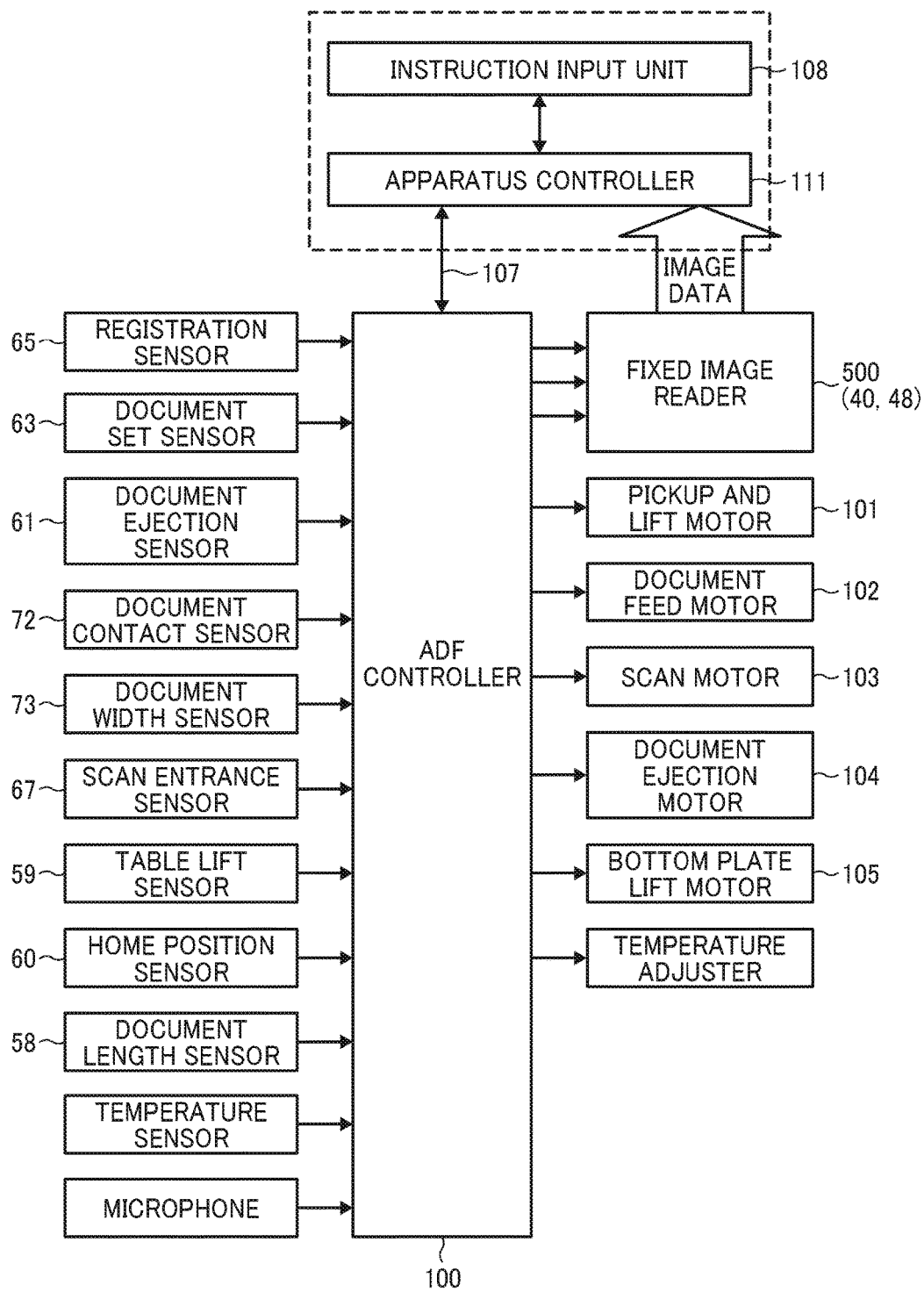
FIG. 3 is a control block diagram of the automatic document feeder.

FIG. 3 is a control block diagram of the entire automatic document feeder 5. A controller 100 that is a control unit of the automatic document feeder 5 controls a series of operations of motors, various sensor units, and the fixed image reader 500. Each of the motors (101 to 105) is a driving unit that drives a conveying operation for a document S, and a fixed image reader 500 is the first face reader 40 or the second face reader 48.

Figure 4:
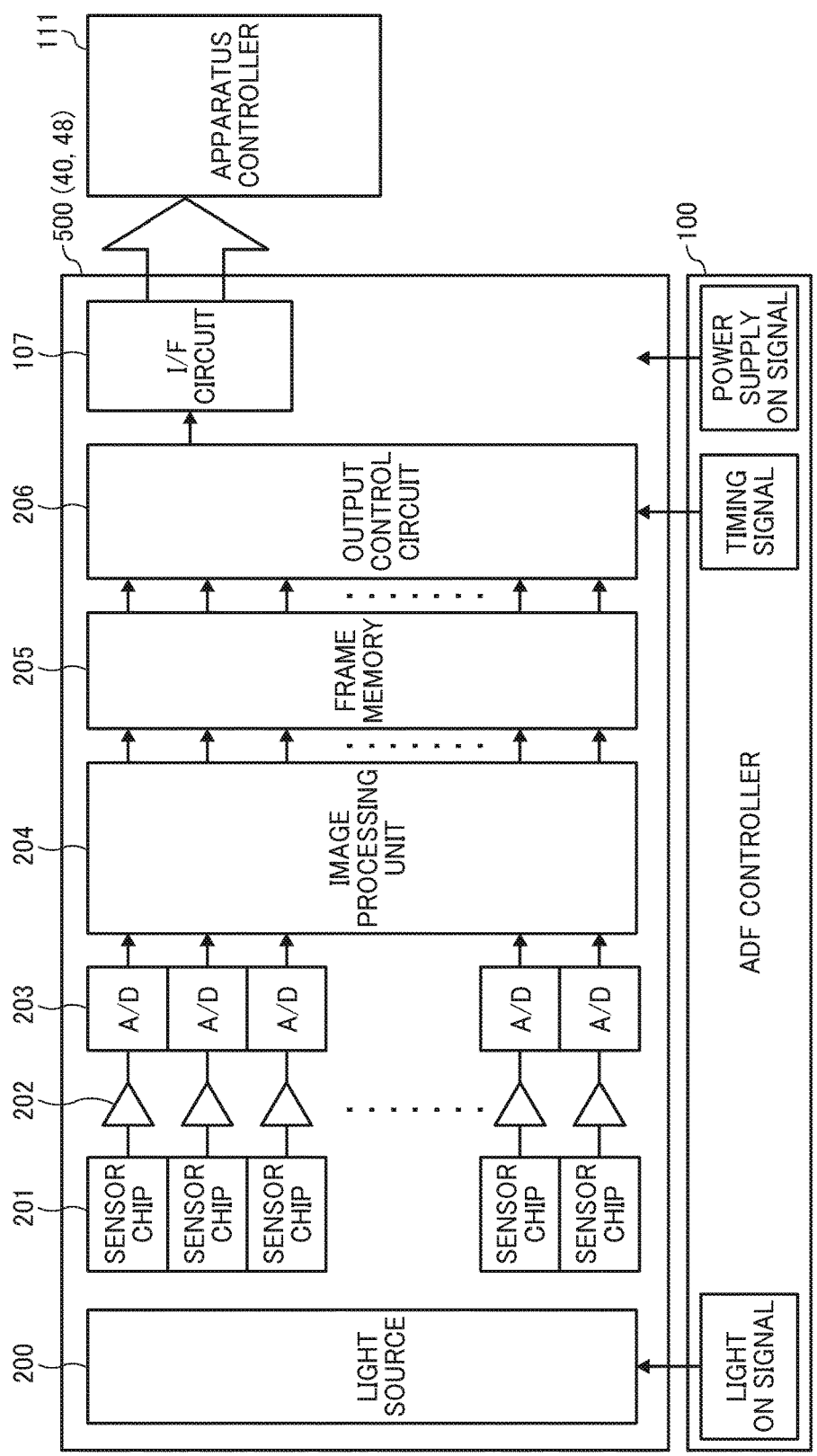
FIG. 4 is a block diagram that illustrates a main part of an electric circuit of a fixed image reader.

FIG. 4 is a block diagram that illustrates a main part of the electric circuit of the fixed image reader 500. The fixed image reader 500 is configured by a light source 200, sensor chips 201, an image processing unit 204, a frame memory 205, an output control circuit 206, an interface circuit (hereinafter, referred to as an interface (I/F) circuit 107), and the like.

The light source 200 includes a light-emitting diode (LED) array, a fluorescent lamp, a cold cathode tube, or the like. A plurality of the sensor chips 201 are arranged in a main scanning direction (a direction corresponding to a document width direction). A plurality of OP amplifier circuits 202 are respectively connected to the plurality of the sensor chips 201. A plurality of analog-digital (A/D) converters 203 are respectively connected to the plurality of OP amplifier circuits 202.

The sensor chip 201 includes a photoelectric conversion device called a same-scale contact image sensor and a condenser lens. Before a document S enters a read position for the fixed image reader 500, a light-on signal is transmitted from the controller 100 to the light source 200. Accordingly, the light source 200 is turned on and emits light to the front face (the first face in the case of the first face reader 40 and the second face in the case of the second face reader 48) of the document. Reflection light reflected on the front face of the document S is condensed into the photoelectric conversion device using the condenser lenses of the plurality of the sensor chips 201, and the condensed light is read as image information. Image information read by each sensor chip 201 is amplified by the OP amplifier circuit 202 and then is converted into digital image information by the A/D converter 203.

The digital image information acquired in this way is input to the image processing unit 204, and, after a shading correction and the like are performed for the digital image information, the acquired digital information is temporarily stored in the frame memory 205. Thereafter, the digital information is converted into a data format that can be received by an apparatus controller 111 by the output control circuit 206 and then is output to the apparatus controller 111 through the I/F circuit 107 as image data. A timing signal for a notification of a timing at which the front end of a document S arrives at a reading position for the fixed image reader 500, a light-on signal of a light source, power, and the like are output from the controller 100. The timing signal described above is a signal causing image data after the timing to be handled as valid data.

A bundle of documents S to be read are set on the document loading stand 53 in a state in which the documents are loaded to have the first faces facing the upper side. The document loading stand 53 is configured by a moving document table 53b that supports the front end side of documents S and can oscillate in directions of arrows a-b illustrated in FIG. 2 in accordance with the thickness of a bundle of the documents S and a fixed document table 53a supporting the rear end side of the documents S.

In addition, the document loading stand 53 includes side guides that respectively abut both ends of a document S in the width direction (a direction orthogonal to the conveying direction of the document S; a direction orthogonal to the sheet face illustrated in FIG. 2). The document S set on the document loading stand 53 has both ends in the width direction to abut the side guides, thereby being positioned in the width direction.

Above the moving document table 53b, a setting feeler 62 that is a lever member that can oscillate is included. In a state in which a document S is not set on the document loading stand 53, the setting feeler 62 is located at a position denoted by a broken line in FIG. 2. This position is a position at which the setting feeler 62 can be detected by the document set sensor 63. By detecting the setting feeler 62 using the document set sensor 63, it is disclosed that the document S is not set on the document loading stand 53.

When a document S is set on the document loading stand 53, the front end of the document S pushes up the setting feeler 62. In accordance with this, the setting feeler 62 is moved from the detection position of the document set sensor 63. When the document set sensor 63 does not detect the setting feeler 62, it is detected that a document S is set, and this detection signal is transmitted to the controller 100 by the document set sensor 63. The controller 100 transmits the received detection signal to the apparatus controller 111 responsible for the control of each device of the document feeding and reading unit 6 through the I/F circuit 107.

The fixed document table 53a includes a plurality of document length sensors 58 (58a, 58b, and 58c) each formed from a reflection-type photo sensor detecting the length of a document S in the conveying direction or a sensor of an actuator type capable of detecting even one sheet of a document. By using such document length sensors, a schematic length a document S in the conveying direction is determined. As the arrangement of the plurality of document length sensors 58, sensor arrangement capable of determining at least whether the same document size is vertical or horizontal is formed.

The automatic document feeder 5 includes the pickup roller 80 above the moving document table 53b. The pickup roller 80 is driven to rotate in accordance with the transfer of driving from the document feed motor 102. In addition, the separation belt 84 and the reverse roller 85 configuring a separation nip as a separation part are driven to rotate in accordance with the transfer of driving from the document feed motor 102.

The moving document table 53b oscillates in the directions of arrows a-b illustrated in FIG. 2 in accordance with a cam mechanism driven in accordance with the driving of a bottom plate lift motor 105. When a document S is detected to be set on the document loading stand 53 by the setting feeler 62 and the document set sensor 63, the controller 100 forwardly rotates the bottom plate lift motor 105. When the bottom plate lift motor 105 is forwardly rotated, the moving document table 53b rotates in the direction of the arrow a illustrated in FIG. 2, and the free end side (the left side in FIG. 2) of the moving document table 53b is lifted. A bundle of documents S set on the document loading stand 53 are also lifted together with the free end side of the moving document table 53b, and the uppermost face of the bundle of documents S is brought into contact with the pickup roller 80.

The pickup roller 80 is supported to be ratable at one end (the right end in FIG. 2) of the pickup bracket 252. In addition, the pickup bracket 252 can be rotated in the directions of arrows c-d illustrated in FIG. 2 around the document sheet feeding unit driving axis 253 of the other end part side (the left end part side in FIG. 2). The pickup bracket 252 rotates in the directions of arrows c-d in FIG. 2 by driving a cam mechanism using a pickup and lift motor 101. The pickup roller 80 moves in the directions of arrows c-d illustrated in FIG. 2 as the pickup bracket 252 rotates in the directions c-d illustrated in FIG. 2.

In addition, the pickup bracket 252 supporting the pickup roller 80 includes the bracket detection target part 254. Furthermore, a frame of the main body of the automatic document feeder 5 includes a table lift sensor 59 at a position above the pickup bracket 252.

The table lift sensor 59 is a sensor that detects whether or not the pickup roller 80 is located at a lifted position by detecting the presence/absence of the bracket detection target part 254 at the detection position. The table lift sensor 59 is a light sensor of a light transmission type detecting whether or not light generated from a light emitting unit is blocked at a detection position between the light emitting unit and a light receiving unit. When the bracket detection target part 254 blocks light at the detection position, it is detected that the bracket detection target part 254 is present at the detection position of the table lift sensor 59.

In the state of being rotated in the direction of the arrow d illustrated in FIG. 2 to be lowered, when the moving document table 53b is lifted to be pressed by the upper face of the document S on the moving document table 53b, the pickup roller 80 rotates in the direction of the arrow c in the drawing and is lifted. By detecting this using the table lift sensor 59, it can be detected that the moving document table 53b has been lifted up to an upper limit. By detecting that the moving document table 53b has been lifted up to the upper limit, the pickup and lift motor 101 is stopped, the bottom plate lift motor 105 is stopped, and a document S is pinched between the moving document table 53b and the pickup roller 80.

The table lift sensor 59 is a sensor detecting that the bottom plate has been lifted up to the upper limit and detecting that the upper face of a bundle of documents S is held at an appropriate sheet feeding height. When the table lift sensor 59 is in an ON state in which the bracket detection target part 254 is detected, the lifting of the moving document table 53b that is a bottom plate is stopped, and sheet feeding is repeated. When the position of the upper face of a bundle of sheets S are lowered by repeating sheet feeding, and the detection state of the table lift sensor 59 is in an OFF state, control is repeated such that the moving document table 53b is lifted to cause the table lift sensor 59 to be in the ON state again. According to such control, the position of the upper face of the bundle of documents S can be constantly maintained at a height that is appropriate for sheet feeding.

When all the documents S set on the document loading stand 53 are fed, the controller 100 reverses the bottom plate lift motor 105 and lowers the moving document table 53b to a home position such that a next bundle of sheets S can be set. When the moving document table 53b is lowered up to the home position, a feeler disposed below the moving document table 53b is detected by a home position sensor 60.

In this embodiment, an elevation mechanism is included in both the moving document table 53b and the pickup roller 80. However, as a mechanism pinching a document S, a configuration may be employed in which an elevation mechanism is included in only one of the moving document table 53b and the pickup roller 80.

A user designates one of a both-face reading mode and a one-face reading mode using the instruction input unit 108 and presses a copy start button of the instruction input unit 108 in a state in which a document S is set on the document loading stand 53. When the copy start button is pressed, the apparatus controller 111 transmits a document feed signal to the controller 100 through the I/F circuit 107. Accordingly, the document feed motor 102 is driven in the direction of forward rotation. In accordance with the driving of forward rotation of the document feed motor 102, the pickup roller 80 is driven to rotate and picks up several (ideally one) documents S on the document loading stand 53. The rotation direction of the pickup roller 80 at this time is a direction (the clockwise direction in FIG. 2) in which an uppermost document S of the bundle of documents S on the document loading stand 53 is conveyed in a direction toward the separation nip to be described later.

Here, when the both-face reading mode or the one-face reading mode is set, the mode may be set to be the same for all the documents S set on the document loading stand 53 or may be differently set for each of the documents S (of the first sheet, the second sheet, . . . , the n-th sheet). As a different setting, for example, there is a setting in which, among all the documents S of ten sheets, the documents S of the first sheet and the tenth sheet are in the both-face reading mode, and the other documents S are in the one-face reading mode or the like.

A document S sent off by the pickup roller 80 is fed to a separation entrance 49 of the separation nip that is a contact position between the separation belt 84 and the reverse roller 85. The separation belt 84 is stretched over the sheet feeding driving roller 82 and the sheet feeding driven roller 83 and endlessly moves in the sheet feeding direction (the clockwise direction in FIG. 2) in accordance with the rotation of the sheet feeding driving roller 82 accompanied with the forward rotation of the document feed motor 102.

The reverse roller 85 is brought into contact with a lower stretching-over face of the separation belt 84. Driving for rotation in a direction (the clockwise direction in FIG. 2) that is opposite to the sheet feeding direction is transferred to the reverse roller 85 in accordance with the forward rotation of the document feed motor 102. In this way, the front-face moving direction at the separation nip between the separation belt 84 and the reverse roller 85 is the reverse direction, and accordingly, a configuration is formed in which an uppermost document S of a bundle of documents S and documents S below the uppermost document S are separated, and only the uppermost document of one sheet can be fed.

In more details, at the separation nip that is the contact part between the separation belt 84 and the reverse roller 85, the front face of the separation belt 84 moves in the sheet feeding direction. Meanwhile, although the front face of the reverse roller 85 tries to move in a direction opposite to the sheet feeding direction, a torque limiter is included in a driving transfer unit of the reverse roller 85. For this reason, when the force of the front face of the reverse roller 85 toward the sheet feeding direction is stronger than the upper-limit torque of the torque limiter, the reverse roller 85 rotates in a counterclockwise direction in FIG. 2 to have the front face to move in the sheet feeding direction.

The reverse roller 85 is brought into contact with the separation belt 84 at a predetermined pressure. In a state in which the reverse roller 85 is in direct contact with the separation belt 84 or in a state in which the reverse roller 85 is in contact with the separation belt 84 through only one sheet of the document S (only one sheet of the document S is pinched in the separation nip), the reverse roller 85 rotates to follow the separation belt 84 or the document S. In other words, the reverse roller 85 rotates in the counterclockwise direction in FIG. 2 that is the sheet feeding direction.

On the other hand, the torque limiter is set such that the following rotation force is weaker than the upper-limit torque of the torque limiter when two or more sheets of documents S are pinched in the separation nip. For this reason, the reverse roller 85 is driven to rotate in the clockwise direction in FIG. 2 that is a direction opposite to the following rotation direction. By driving the reverse roller 85 to rotate in a direction opposite to the following rotation direction, a moving force in a direction opposite to the sheet feeding direction is applied to documents S other than the uppermost document S among documents S conveyed toward the separation nip by the reverse roller 85. Accordingly, surplus documents S are pressed back, and only one sheet of the uppermost document S can be separated from a plurality of sheets of documents S, and multi conveying can be prevented.

The document S separated as one sheet in accordance with an action between the separation belt 84 and the reverse roller 85 is caused to enter the registration unit C. Then, this document S is further sent using the separation belt 84, the front end of the document S is detected by the document contact sensor 72, and thereafter, the document S is further conveyed, whereby the front end of the document S abuts a pullout roller 86 of which rotation is stopped. At this time, the driving document feed motor 102 is driven for a predetermined time after the detection of the front end of the document S that is detected by the document contact sensor 72 and thereafter is stopped. Accordingly, the document S is conveyed by a predetermined distance from the detection position of the document S that is detected by the document contact sensor 72. Then, as a result, in a state in which the document S is pressed to the pullout roller 86 with a predetermined amount of bending, the conveyance of the document S using the separation belt 84 is stopped.

By rotating the pickup and lift motor 101 when the front end of a sheet S is detected using the document contact sensor 72, the pickup roller 80 retreats from the upper face of the document S, and the document S is conveyed using only a conveying force of the separation belt 84. Accordingly, the front end of the document S enters a nip formed by one pair of pullout rollers 86, and matching of the front end of the document S (skew correction) can be performed.

The pullout roller 86, as described above, is a roller that has a skew correction function and is used for conveying the skew-corrected document S up to the intermediate roller 66 after separation. By reversely driving the document feed motor 102, one of two rollers configuring the pullout rollers 86 is driven to rotate and conveys the document S. In a case in which the document feed motor 102 is reversely driven, driving is input to the pullout roller 86 and the intermediate roller 66, and driving is not input to the pickup roller 80, the separation belt 84, and the reverse roller 85. In other words, a configuration is formed in which driving is transferred to the pickup roller 80, the separation belt 84, and the reverse roller 85 when the document feed motor 102 is forwardly rotated, and driving is transferred to the pullout roller 86 and the intermediate roller 66 when the document feed motor 102 is reversely rotated.

The document S sent out by the pullout roller 86 passes right below the document width sensor 73. The document width sensor 73 is a sensor acquired by aligning a plurality of paper detection sensors each formed from a reflection-type photo sensor or the like in a document width direction (a direction orthogonal to the sheet face illustrated in FIG. 2). Then, on the basis of a paper detection sensor that detects the document S, the size of the document S in the width direction is detected. In addition, the length of a document S in the conveying direction is detected from a motor pulse on the basis of a timing until the document S is not detected by the document contact sensor 72 (the rear end of the document S passes) after the front end of the document S is detected by the document contact sensor 72.

The document S conveyed in accordance with the rotary driving of the pullout roller 86 and the intermediate roller 66 enter the turn unit D conveyed using the intermediate roller 66 and the reading entrance roller 97.

In the automatic document feeder 5, when the document S is conveyed from the registration unit C to the turn unit D in accordance with rotary driving of the pullout roller 86 and the intermediate roller 66, the conveying speed at the registration unit C is set to be higher than the conveying speed at the first reading conveying unit E. Accordingly, shortening of the processing time for feeding the document S to the first reading conveying unit E is achieved.

When the front end of the document S is detected by a scan entrance sensor 67, the deceleration of the document feed motor 102 is started. Simultaneously with this, the scan motor 103 is driven to forwardly rotate. By driving the scan motor 103 to forwardly rotate, the reading entrance roller 97, a reading exit roller 92, and a second reading exit roller 93 are driven to rotate in the conveying direction. By decelerating the document feed motor 102, the rotation speed of the intermediate roller 66 that is driven to rotate by the document feed motor 102 is decreased. Accordingly, before the front end of the document S enters a nip formed by upper and lower rollers of the reading entrance roller 97, the conveying speed of the document S can be the same conveying speed at the first reading conveying unit E.

When the front end of the document S from the turn unit D toward the first reading conveying unit E is detected by the registration sensor 65, the controller 100 decreases the driving speed of each motor over a predetermined time. Accordingly, the conveying speed of the document S is decreased over a predetermined conveying distance. Then, the controller 100 performs control such that the document S is temporarily stopped in front of a first reading position 700 at which an image of the first face of the document S is read by the first face reader 40. In addition, together with the control of the temporary stop, the controller 100 transmits a signal for stopping the reading entrance roller 97 to the apparatus controller 111 through the I/F circuit 107.

Subsequently, when the controller 100 receives a reading start signal from the apparatus controller 111, the driving of the scan motor 103 is started. At this time, the driving of the scan motor 103 is controlled such that the conveying speed of the document S increases up to a predetermined conveying speed until the front end of the document S that has stopped in front of the first reading position 700 arrives at the first reading position 700. Accordingly, the document S is conveyed toward the first reading position 700 while the conveying speed of the document S is increased.

Next, the controller 100 calculates a timing at which the front end of the document S arrives at the first reading position 700 on the basis of a pulse count of the scan motor 103. Then, at the calculated timing, the controller 100 transmits a gate signal representing an effective image area of the first face of the document S in the sub scanning direction to the apparatus controller 111. The transmission of this gate signal is continued until the rear end of the document S moves out of the first reading position 700, and the first face of the document S is read by the first face reader 40.

As illustrated in FIG. 2, the upper face of the abutting member 47 is inclined such that the height of the left end side is low. Accordingly, the front end of the document S that has passed through the first reading position 700 can be lifted in accordance with the inclination of the abutting member 47 to be directed toward the nip of the reading exit roller 92.

The front end of the document S passing through the first reading conveying unit E and passing the nip of the reading exit roller 92 is detected by a document ejection sensor 61 and is conveyed to the second reading conveying unit F. Thereafter, the document S that has passed through the second reading conveying unit F is conveyed to the sheet ejecting unit G.

In the case of the one-face reading mode in which only one face (first face) of the document S is read, it is unnecessary to read the second face of the document S using the second face reader 48. Thus, when the front end of the document is detected by the document ejection sensor 61, the document ejection motor 104 is started to be driven to forwardly rotate, and an upper sheet ejecting roller in FIG. 2 out of document ejecting rollers 94 is driven to rotate in the counterclockwise direction in the drawing.

In addition, a timing at which the rear end of the document S moves out of the nip of the document ejecting roller 94 is calculated on the basis of a pulse count of the document ejection motor 104 after the detection of the front end of the document using S the document ejection sensor 61. Then, on the basis of a result of the calculation, the driving speed of the document ejection motor 104 is started to be decreased at a timing immediately before the rear end of the document S moves out of the nip of the document ejecting roller 94. In accordance with the control of the deceleration, the document S ejected onto the document stack stand 55 can be ejected at a speed for which the document S does not fly out from the document stack stand 55.

On the other hand, in the case of the both-face reading mode in which both faces (the first face and the second face) of the document S are read, the following control is performed. After the front end of the document S is detected by the document ejection sensor 61, a timing at which the front end of the document S arrives at the second face reader 48 is calculated on the basis of a pulse count of the scan motor 103. Then, at this calculated timing, the controller 100 transmits a gate signal representing an effective image area of the second face of the document S in the sub scanning direction to the apparatus controller 111. The transmission of this gate signal is continued until the rear end of the document S moves out of the second reading position for the second face reader 48, and the second face of the document S is read by the second face reader 48.

The second face reader 48 as a reading means includes a contact-type image sensor (CIS). In order to prevent a reading vertical stripe according to attachment of a foreign material having a paste shape attached to a document S to the reading face, a coating process is performed for the reading face. In addition, a second reader opposing roller 96 as a document supporting means supporting a document S from a non-reading face side (the first face side) is arranged at a position facing the second face reader 48 with a sheet conveying path, through which the document S passes, interposed between the second reader opposing roller 96 and the second face reader 48. This second reader opposing roller 96 has a role for suppressing floating of a document S with respect to the second face reader 48 at the second reading position and a role for functioning as a reference white part used for acquiring shading data of the second face reader 48.

The automatic document feeder 5 according to this embodiment includes two fixed image readers 500 including the first face reader 40 and the second face reader 48 as conveying document reader reading an image of a conveying document S. The configuration for reading images of both faces of a document S is not limited to a configuration including two fixed image readers 500. Thus, a configuration may be employed in which a document S of which the front face has been read by one fixed image reader 500 is switched back, and the rear face of the document S is read when the document S passes through a reading position of the fixed image reader 500 again.

Figure 5:
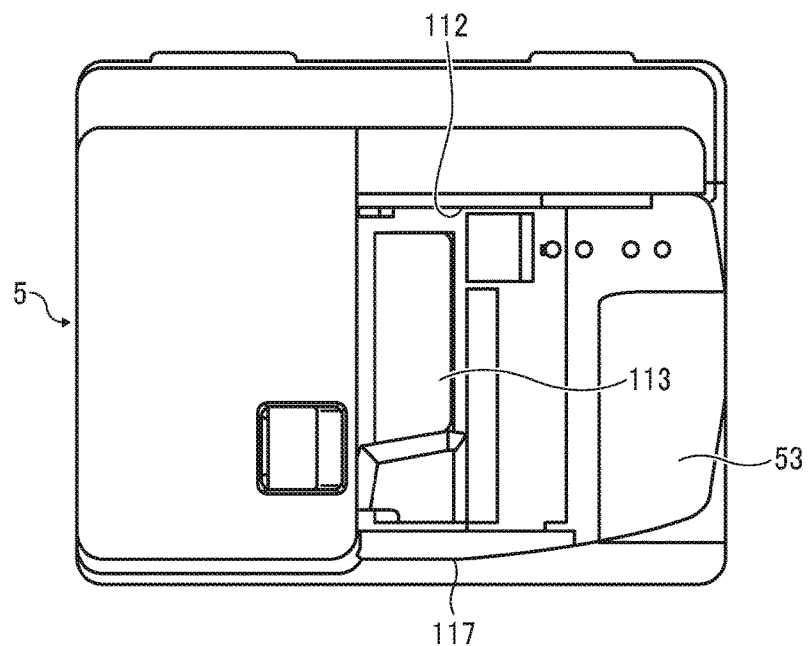
FIG. 5 is a top view of an automatic document feeder.

FIG. 5 is a top view of the automatic document feeder 5.

A setting reference face 112 at the time of setting a document is disposed at one end (the rear side of the apparatus) of the document loading stand 53 in the width direction of a document of the apparatus (hereinafter, simply referred to as a width direction). In addition, in the document loading stand 53, a side fence 117 is disposed, and the side fence 117 is disposed to be slidable along a rail 113 disposed in the document loading stand 53 in the width direction.

A document set on the document loading stand 53 has one end brought into contact with the setting reference face 112 and the other end in the width direction brought into contact with the side fence 117, thereby being positioned in the document loading stand 53. Since the document is positioned by the setting reference face 112 and the side fence 117, the document is conveyed from the document loading stand 53 without occurrence of skew or the like.

As a technique for setting a document in the document loading stand 53 other than that described above, there is a technique in which one pair of side fences are disposed, and a document is set at the center of the document loading stand 53 in the width direction using the one pair of side fences. In the technique in which a document is set at the center of the document loading stand 53 in the width direction using the one pair of side fences, there is a problem in that the operability of the side fences deteriorates in a case in which faces of the side fences regulating the movement of the document in the width direction by being brought into contact with end parts of the document in the width direction are formed to be long in the conveying direction. In addition, since the side fences are disposed in the document loading stand 53 to be slidable in the width direction, rattling necessarily occurs. As a result, when the regulating faces are formed to be long in the conveying direction, there is concern that the document cannot be set in parallel with the conveying direction. As a result, the side fences are not disposed near the pickup roller 80, and the document is not regulated up to the end by the one pair of the side fences, and there is concern that skew occurs. Particularly, when a plurality of documents having different widths are set on the document loading stand 53, a document having a narrow width is regulated by only one of the one pair of the side fences, and accordingly, skew may easily occur.

In contrast to this, as in this embodiment, in a method in which one end side in the width direction is configured as the fixed setting reference face 112, and a document is set on the document loading stand 53 with one end of the document in the width direction brought into contact with the setting reference face 112, the setting reference face 112 can be long in the document conveying direction. As a result, the document can be regulated by the setting reference face 112 up to a position near the pickup roller 80. Accordingly, the occurrence of skew or the like in a document conveyed from the document loading stand 53 can be suppressed. Particularly, when a plurality of documents having different widths are set on the document loading stand 53, a document having a narrow width of which the other end in the width direction is not regulated by the side fence is regulated by the setting reference face 112 up to a position near the pickup roller 80, and accordingly, the occurrence of skew can be effectively suppressed.

Figure 6:
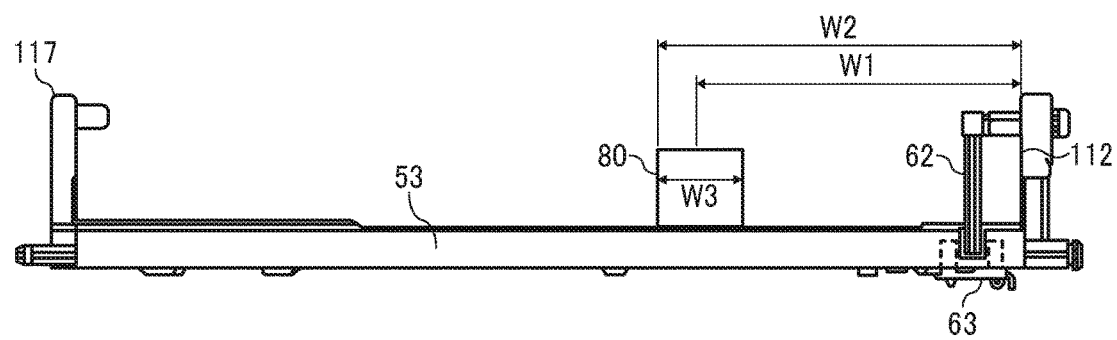
FIG. 6 is a diagram that illustrates a positional relation in a width direction between a document loading stand and a pickup roller.

FIG. 6 is a diagram that illustrates a positional relation in the width direction between the document loading stand 53 and the pickup roller 80.

In the drawing, a setting feeler 62 is attached to the setting reference face 112 to be ratable. In the document loading stand 53, a hole in which the tip end of the setting feeler 62 is inserted is disposed. In addition, on the bottom face of the document loading stand 53, a document set sensor 63 configured by an optical sensor of a transmission type is disposed. As illustrated in FIG. 6, when a document is not set on the document loading stand 53, the tip end of the setting feeler 62 is positioned between a light emitting unit and a light receiving unit of the document set sensor 63 and blocks light of the light emitting unit. When a document is set on the document loading stand 53, the front end of the document pushes the setting feeler 62 in the conveying direction, and the setting feeler 62 is rotated. Then, the tip end of the setting feeler 62 retreats from between the light emitting unit and the light receiving unit of the document set sensor 63, and the light receiving unit detects light of the light emitting unit. In this way, the setting of the document can be detected.

Generally, in order to stably convey a document having a highest conveying frequency, the pickup roller 80 is disposed such that the center of the pickup roller 80 in the width direction is adjusted to the center of the document having the highest conveying frequency in the width direction. Thus, a distance W1 from the setting reference face 112 to the center of the pickup roller 80 in the width direction is "½" of the width of the document having the highest conveying frequency. For example, in a case in which the center of the pickup roller 80 in the width direction is adjusted to the center of A4T (vertical) 210 [mm] in the width direction, the distance W1 is 105 [mm].

In addition, a distance W2 from the setting reference face 112 to a side fence-side end part of the pickup roller 80 is shorter than a minimum width size that can be conveyed by the automatic document feeder 5, and the end part of a document having the minimum width size is not in contact with the pickup roller 80. The reason for this is that when the end part of the document is in contact with the pickup roller 80, a damage such as edge folding may occur in the document. Accordingly, for example, in a case in which a B6T size having a width of 128 [mm] is a minimum size, the distance W2 described above needs to be 128 [mm] or less. Thus, the width of the pickup roller 80 (a length in the direction of the rotation axis) W3 is 46 [mm].

In recent years, in Europe, the demand for copying documents having an A6 size has been increased. In addition, in financial institutions and the like, the demand for copying a check or a note has been increased. A representative size of a check is represented in the following Table 1.

TABLE 1

| Name | Size |
| --- | --- |
| Check 1 | 84 × 168 mm |
| Check 2 | 84 × 169 mm |
| Check 3 | 76 × 169 mm |

TABLE 1-continued

| Name | Size |
| --- | --- |
| Check 4 | 76 × 211 mm |
| Note 1 | 93 × 216 mm |
| Note 2 | 93 × 218 mm |
| Dividend certificate | 101 × 211 mm |

For example, in order to respond to the size of a check 3 having a width 76 [mm]× a vertical length 169 [mm] illustrated in Table 1, the distance W2 described above needs to be set to be 76 [mm] or less. However, when the distance W2 described above is set to be 76 [mm] or less, the center of the pickup roller 80 in the width direction cannot be adjusted to the center of the document (for example, A4T) in the width direction that has the highest conveying frequency. As a result, a conveying defect such as skew occurs in a document having the size that has the highest conveying frequency.

On the other hand, when the center of the pickup roller 80 in the width direction is adjusted to the center of the document size (for example, A4T) in the width direction that has the highest frequency, a document having the size of the check 3 of the width 76 [mm]× the vertical length 169 [mm] is not conveyed by the pickup roller 80. By increasing the width W3 of the pickup roller 80, the pickup roller 80 can be brought into contact with a document having the check size of the width 76 [mm]× the vertical length 169 [mm], and the document having the check size of the width 76 [mm]× the vertical length 169 [mm] can be conveyed. However, in such a case, an end part of the document is in contact with the pickup roller 80, and a damage such as edge folding may be caused in the document.

Thus, in this embodiment, by installing a sheet feeding sub tray in the document loading stand 53, a document having a small size such as a check size can be conveyed without any problem. Hereinafter, description will be presented more specifically with reference to the drawings.

Figure 7:
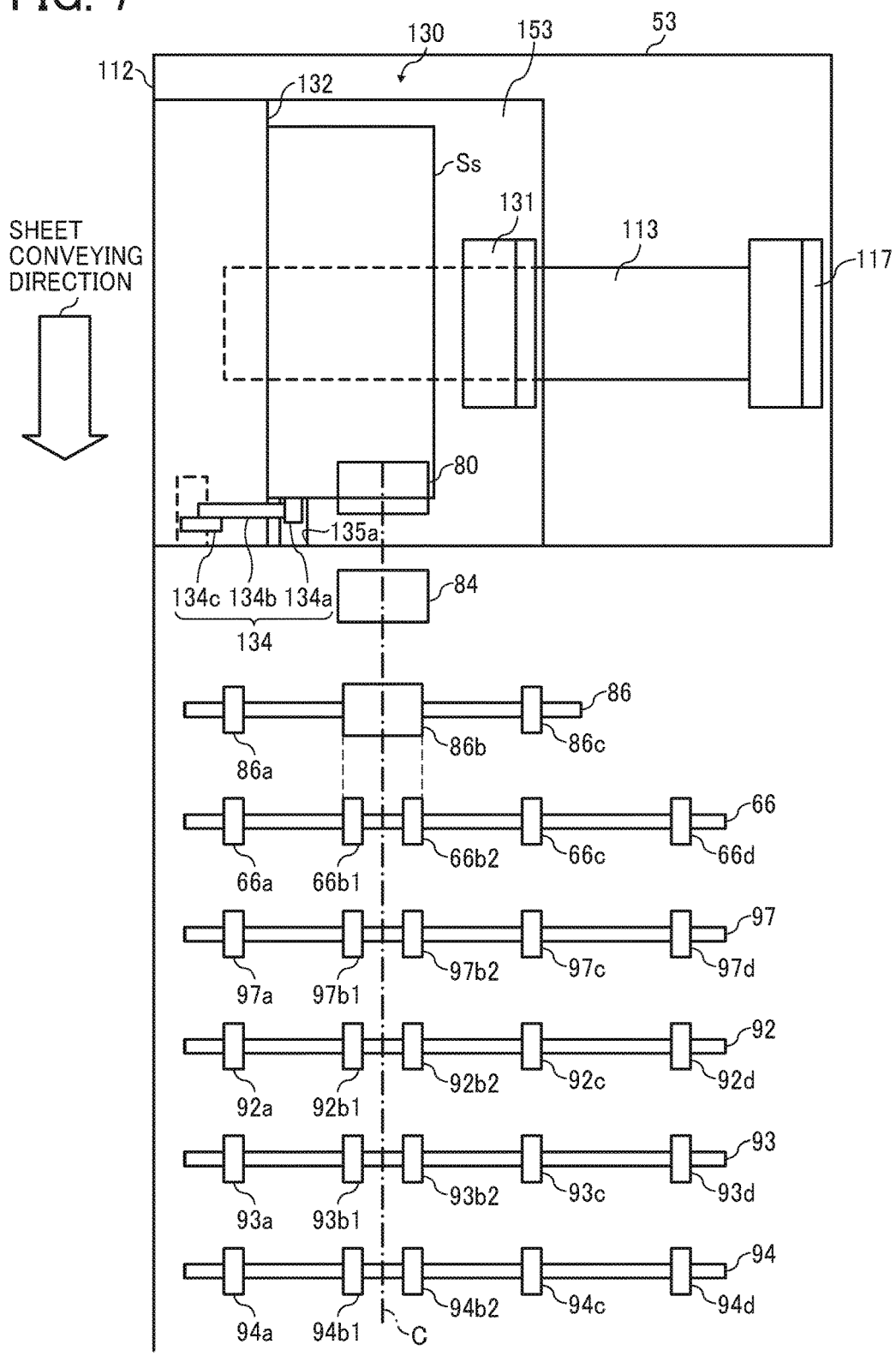
FIG. 7 is a schematic diagram that illustrates a sheet feeding sub tray installed in a document loading stand and a member conveying a document of an automatic document feeder.
Figure 8:
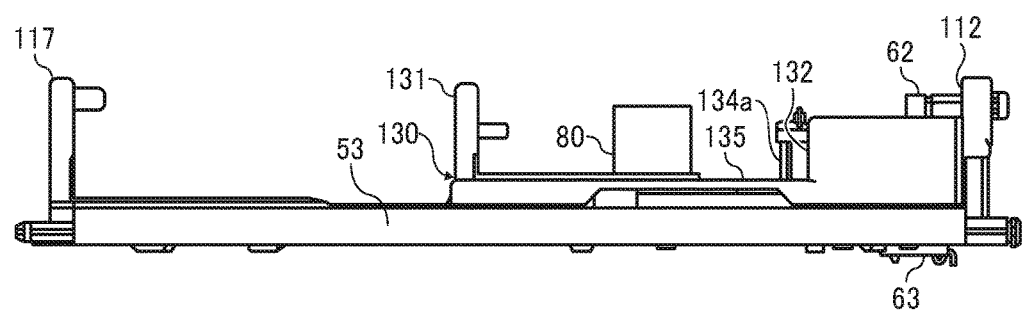
FIG. 8 is a schematic diagram that illustrates a sheet feeding sub tray installed in a document loading stand and a pickup roller.

FIG. 7 is a schematic diagram that illustrates a sheet feeding sub tray 130 installed in the document loading stand 53 and a member conveying a document of the automatic document feeder 5, and FIG. 8 is a schematic diagram that illustrates a sheet feeding sub tray 130 installed in the document loading stand 53 and the pickup roller 80.

The sheet feeding sub tray 130 includes a small-size setting reference face 132 and a small-size side fence 131. The small-size side fence 131 is disposed to be slidable in the width direction on a bottom plate 135 of the sheet feeding sub tray 130. In this way, by disposing the small-size side fence 131 in the sheet feeding sub tray 130, on the bottom plate 135 of the sheet feeding sub tray 130, only a document (hereinafter, referred to as a small-size document) having a smaller size than the minimum size document (B6T) that can be conveyed by this automatic document feeder can be loaded.

The small-size setting reference face 132 is positioned on a further center side of the document loading stand 53 (the front side of the apparatus) in the width direction than the setting reference face 112 of the document loading stand 53. Accordingly, a small-size document Ss, which is loaded in the bottom plate 135 of the sheet feeding sub tray 130, having one end in the width direction being brought into contact with this small-size setting reference face 132 is in contact with the pickup roller 80 and can be conveyed by the pickup roller 80. In addition, as illustrated in FIG. 7, the small-size setting reference face 132 is configured such that a side fence-side end part of the small-size document set on the sheet feeding sub tray 130 is on a further side fence side (front side) than the side fence-side end part of the pickup roller 80. For example, in a case where the distance W1 illustrated in FIG. 6 is set to 105 [mm], and the distance W2 is set to 128 [mm], the small-size setting reference face 132 is disposed at a position separate from the setting reference face 112 by 52 [mm] or more. Accordingly, the side fence-side end part of a check document (a check 3 or a check 4) having the minimum width size illustrated in Table 1 can be positioned on a further side fence side than the side fence-side end part of the pickup roller 80. Accordingly, the end part of the check document (the check 3 or the check 4) having the minimum width size illustrated in Table 1 is not in contact with the pickup roller 80, and the occurrence of edge folding or the like can be suppressed.

In addition, as illustrated in FIG. 7, the width of the separation belt 84 has the same dimension as the width of the pickup roller 80, and the center of the separation belt 84 in the width direction coincides with the center of the pickup roller 80 in the width direction (a dashed line C in the drawing). Accordingly, the small-size document set on the sheet feeding sub tray 130 is satisfactorily conveyed by the separation belt 84 without the occurrence of edge folding or the like. In addition, a pullout roller 86 is configured by three pullout conveying rollers 86*a*, 86*b*, and 86*c*, and the small-size document described above is conveyed by the center pullout conveying roller 86*b*. The center pullout conveying roller 86*b* has the same width of the pickup roller 80 and has the center in the width direction to coincide with the center of the pickup roller 80 in the width direction. Accordingly, the small-size document is satisfactorily conveyed by the center pullout conveying roller 86*b* without the occurrence of edge folding or the like. Thereafter, the small-size document is conveyed by two small-size conveying rollers (66*b*1, 66*b*2, 97*b*1, 97*b*2, 92*b*1, 92*b*2, 93*b*1, 93*b*2, 94*b*1, 94*b*2) arranged second and third from the left side of each roller (an intermediate roller 66, a reading entrance roller 97, a reading exit roller 92, a second reading exit roller 93, and a document ejecting roller 94) in the drawing. For example, as illustrated in FIG. 7, the intermediate roller 66 includes conveying rollers 66*a*, 66*b*1, 66*b*2, 66*c*, and 66*d*. The reading entrance roller 97 includes conveying rollers 97*a*, 97*b*1, 97*b*2, 97*c*, and 97*d*. The reading exit roller 92 includes conveying rollers 92*a*, 92*b*1, 92*b*2, 92*c*, and 92*d*. The second reading exit roller 93 includes conveying rollers 93*a*, 93*b*1, 93*b*2, 93*c*, and 93*d*. The document ejecting roller 94 includes conveying rollers 94*a*, 94*b*1, 94*b*2, 94*c*, and 94*d*.

In addition, in the description presented above, the widths of the pickup roller 80, and the separation belt 84, and the center pullout conveying roller 86*b* are the same, and thus, the position of the small-size setting reference face 132 is determined on the basis of the position of the side-fence side end part of the pickup roller 80. However, the small-size setting reference face 132 is configured on the basis of the position of the side fence-side end part of a conveying roller having a largest width among the conveying rollers conveying the small-size sheet. For example, in a case in which the center pullout conveying roller 86*b* of the pullout roller 86 has a large width that is larger than those of the pickup roller 80 and the separation belt 84 by 10 mm, and the center pullout conveying roller 86*b* is a conveying roller having a largest width among the conveying rollers conveying the small-size sheet, the small-size setting reference face 132 is configured on the basis of the position of the side fence-side end part of the center pullout conveying roller 86*b*. In other words, the small-size setting reference face 132 is config- ured such that the side fence-side end part of the small-size document set on the sheet feeding sub tray 130 is further on a side fence-side (front side) than the side fence-side end part of the center pullout conveying roller 86*b*.

Figure 9:
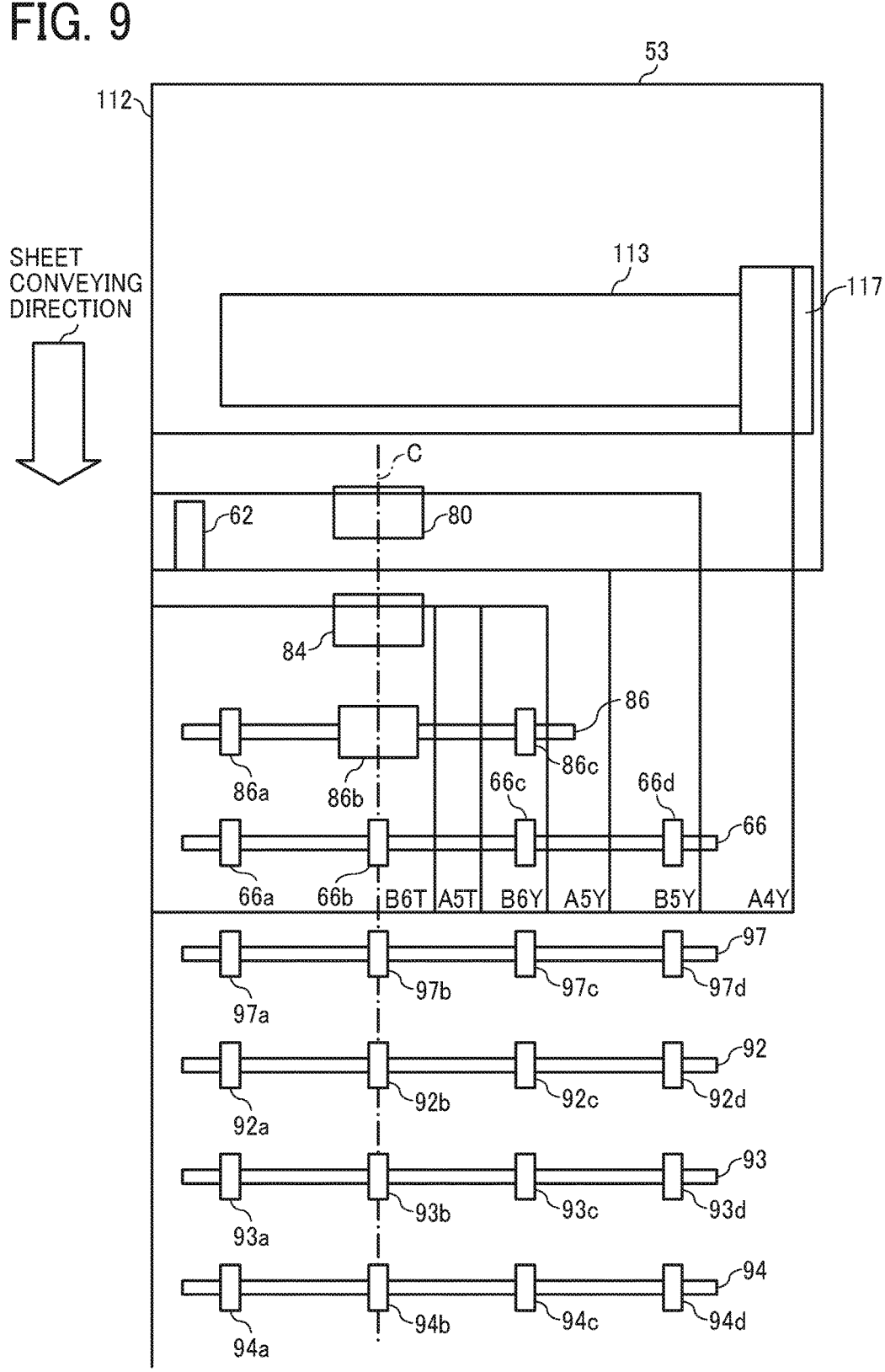
FIG. 9 is a diagram that illustrates a comparative example of an automatic document feeder.

FIG. 9 is a diagram that illustrates a comparative example of an automatic document feeder.

As illustrated in FIG. 9, four conveying rollers including an intermediate roller 66, a reading entrance roller 97, a reading exit roller 92, a second reading exit roller 93, and a document ejecting roller 94 are arranged at an equal space. A document having a size B6T or A5T can be stably conveyed by two conveying rollers from the left side. In addition, a document having the size B6Y (horizontal) or A5Y can be conveyed by three conveying rollers from the left side. Furthermore, a document having the size B5Y (horizontal) or A4Y can be conveyed by all the conveying rollers.

In the configuration illustrated in FIG. 9, when the sheet feeding sub tray 130 is installed, and a small-size document is conveyed, in the intermediate roller 66, the reading entrance roller 97, the reading exit roller 92, the second reading exit roller 93, and the document ejecting roller 94, the small-size document is conveyed only by second conveying rollers 66*b*, 97*b*, 92*b*, 93*b*, 94*b* from the left side arranged at the position of the center of the pickup roller 80 in the width direction, and accordingly, the conveying is not stable, and skew or the like might occur.

Hence, in this embodiment, as illustrated in FIG. 7, each of the second conveying rollers 66*b*, 97*b*, 92*b*, 96*b*, 94*b* is configured by two conveying rollers. Accordingly, the small-size document can be conveyed by two conveying rollers, and thus the small-size document can be stably conveyed. In addition, the conveying forces of these small-size conveying rollers (66*b*1, 66*b*2, 97*b*1, 97*b*2, 92*b*1, 92*b*2, 96*b*1, 96*b*2, 94*b*1, and 94*b*2) are set to "½" of the conveying forces of the other conveying forces. For example, by configuring the nip pressures of the small-size conveying rollers (66*b*1, 66*b*2, 97*b*1, 97*b*2, 92*b*1, 92*b*2, 96*b*1, 96*b*2, 94*b*1, and 94*b*2) to be a half of the nip pressures of the other conveying rollers, the conveying forces of the small-size conveying rollers (66*b*1, 66*b*2, 97*b*1, 97*b*2, 92*b*1, 92*b*2, 96*b*1, 96*b*2, 94*b*1, and 94*b*2) can be "½" of the conveying forces of the other conveying forces. In this way, by configuring the conveying forces of the small-size conveying rollers (66*b*1, 66*b*2, 97*b*1, 97*b*2, 92*b*1, 92*b*2, 96*b*1, 96*b*2, 94*b*1, and 94*b*2) to be "½" of the conveying forces of the other conveying forces, for example, when a document having the size B6T or A5T, the conveying forces of the one end side and the other end side in the width direction can be almost the same, and accordingly, the occurrence of skew can be suppressed.

In addition, in this embodiment, as illustrated in FIG. 7, the setting feeler 62 of the automatic document feeder 5 is disposed near the setting reference face 112 and is covered with the sheet feeding sub tray 130 when the sheet feeding sub tray 130 is disposed, and accordingly, the setting detection cannot be performed. For this reason, in the sheet feeding sub tray 130, a small-size setting detecting mechanism 134 detecting that a small-size document is set on the sheet feeding sub tray 130 is included. The small-size setting detecting mechanism 134 is configured by: a rotation shaft 134*b* that is supported by a casing part, which is disposed on the rear side, having the small-size setting reference face 132 of the sheet feeding sub tray 130 to be ratable; a small-size setting feeler 134*a* that is disposed at one end of the rotation shaft 134*b*; and a pushing part 134*c* that pushes a setting feeler 62 disposed at the other end of the rotation shaft 134*b*. In addition, on the bottom plate 135 of the sheet feeding sub tray 130, a notch 135a into which the tip end of the small-size setting feeler 134a is inserted is disposed.

Figure 10A:
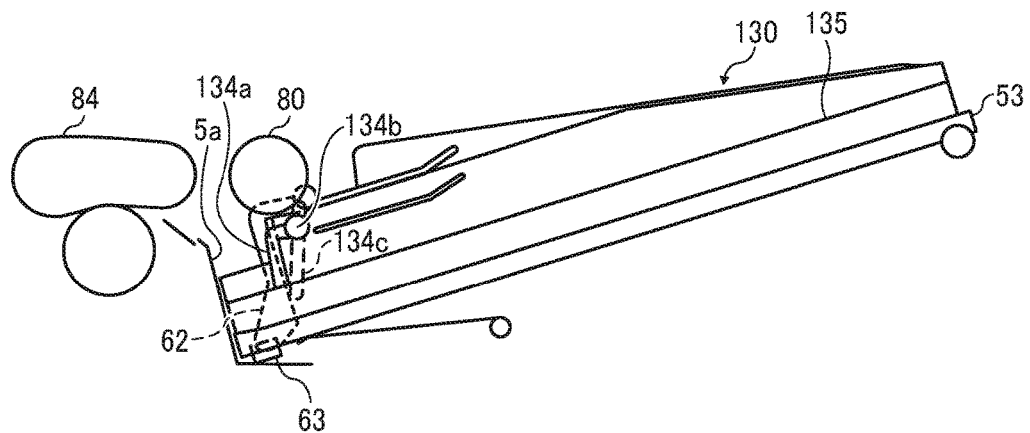
FIGS. 10A and 10B are illustrations of document setting detection of a small-size setting detecting mechanism.
Figure 10B:
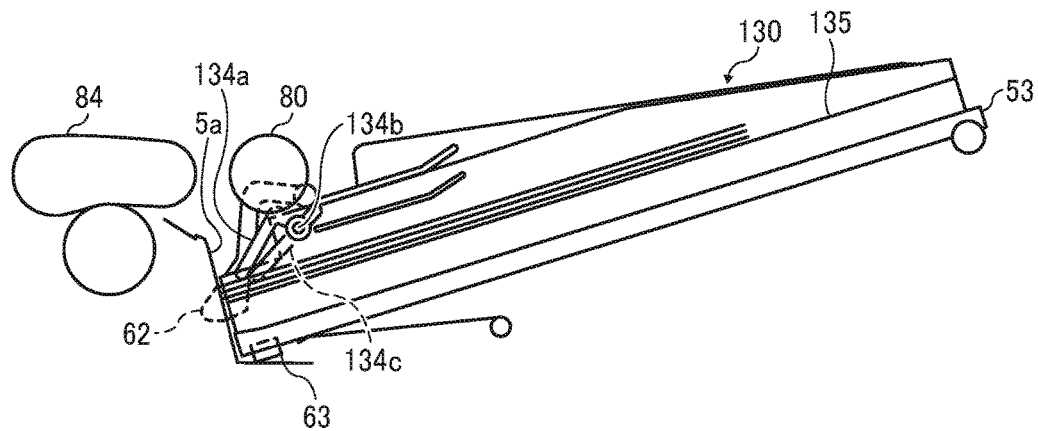

FIGS. 10A and 10B are illustrations of document setting detection of the small-size setting detecting mechanism 134. FIG. 10A illustrates an appearance before setting a small-size document, and FIG. 10B illustrates an appearance when a small-size document is set on the sheet feeding sub tray 130.

As illustrated in FIG. 10A, when a small-size document is not set on the sheet feeding sub tray 130, the tip end of the small-size setting feeler 134a enters the notch 135a. In addition, at this time, the pushing part 134c does not push the setting feeler 62, and the tip end of the setting feeler 62 is positioned between the light emitting unit and the light receiving unit of the document set sensor 63 and blocks light of the light emitting unit.

As illustrated in FIG. 10B, when a small-size document is set on the sheet feeding sub tray 130, the front end of the small-size document pushes the small-size setting feeler 134a and rotates the small-size setting feeler 134a in the clockwise direction in the drawing. When the small-size setting feeler 134a is rotated in the clockwise direction in the drawing, the pushing part 134c is also rotated around the rotation shaft 134b in the clockwise direction in the drawing and pushes the setting feeler 62. As a result, the setting feeler 62 is rotated in the clockwise direction in the drawing together with the pushing part 134c, and the tip end of the setting feeler 62 retreats from between the light emitting unit and the light receiving unit of the document set sensor 63. Accordingly, the light receiving unit of the document set sensor 63 detects light of the light emitting unit, and the setting of the document is detected.

In addition, in this embodiment, as illustrated in FIG. 10B, the small-size setting detecting mechanism 134 is configured such that the tip end of the setting feeler 62 does not retreat from between the light emitting unit and the light receiving unit of the document set sensor 63 until the front end of the small-size document is positioned on a further downstream side in the conveying direction than the pickup roller 80. More specifically, the rotation range of the small-size setting feeler 134a and a rotation angle of the small-size setting feeler 134a at which the pushing part 134c starts to push the setting feeler 62 are appropriately set.

In this way, when the front end of the small-size document is positioned on a further downstream side in the conveying direction than the pickup roller 80, the tip end of the setting feeler 62 retreats from between the light emitting unit and the light receiving unit of the document set sensor 63, and the document setting is detected, whereby the pickup roller 80 can be reliably brought into contact with the small-size document set on the sheet feeding sub tray 130 at the time of conveying the sheet. In this way, the occurrence of no sheet feeding can be prevented.

Next, the installation of the sheet feeding sub tray 130 in the document loading stand 53 will be described.

Figure 11:
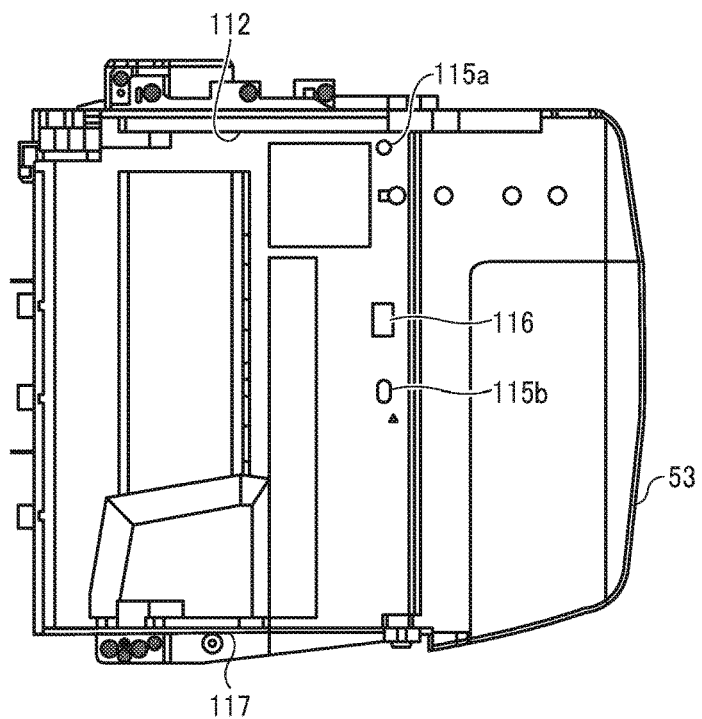
FIG. 11 is a front view that illustrates a document loading stand in which a sheet feeding sub tray can be installed.

FIG. 11 is a front view that illustrates the document loading stand 53 in which the sheet feeding sub tray 130 can be installed.

As illustrated in FIG. 11, in the document loading stand 53, a first positioning hole 115a and a second positioning hole 115b are disposed at two places in the width direction. In addition, between the first positioning hole 115a and the second positioning hole 115b, a fixing magnet 116 used for fixing the sheet feeding sub tray 130 is disposed.

Figure 12:
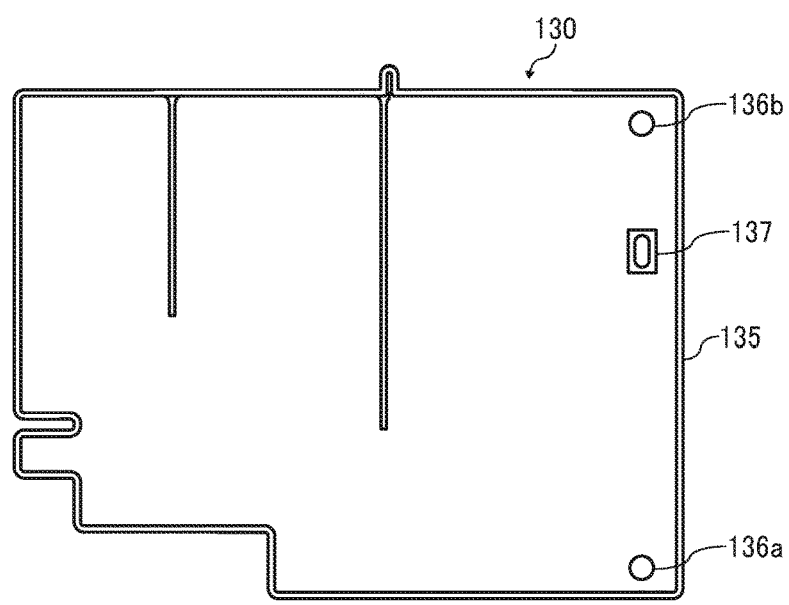
FIG. 12 is a diagram that illustrates a bottom face of a sheet feeding sub tray.

FIG. 12 is a diagram that illustrates a bottom face of the sheet feeding sub tray 130.

As illustrated in the drawing, on the bottom face of the sheet feeding sub tray 130, a first positioning projection 136a and a second positioning projection 136b fitting into the positioning holes disposed in the document loading stand 53 illustrated in FIG. 11 are disposed with a predetermined gap interposed between the first positioning projection 136a and the second positioning projection 136b in the width direction. In addition, between the first positioning projection 136a and the second positioning projection 136b, a metal plate 137 attracted to the fixing magnet 116 is disposed.

Figure 13A:
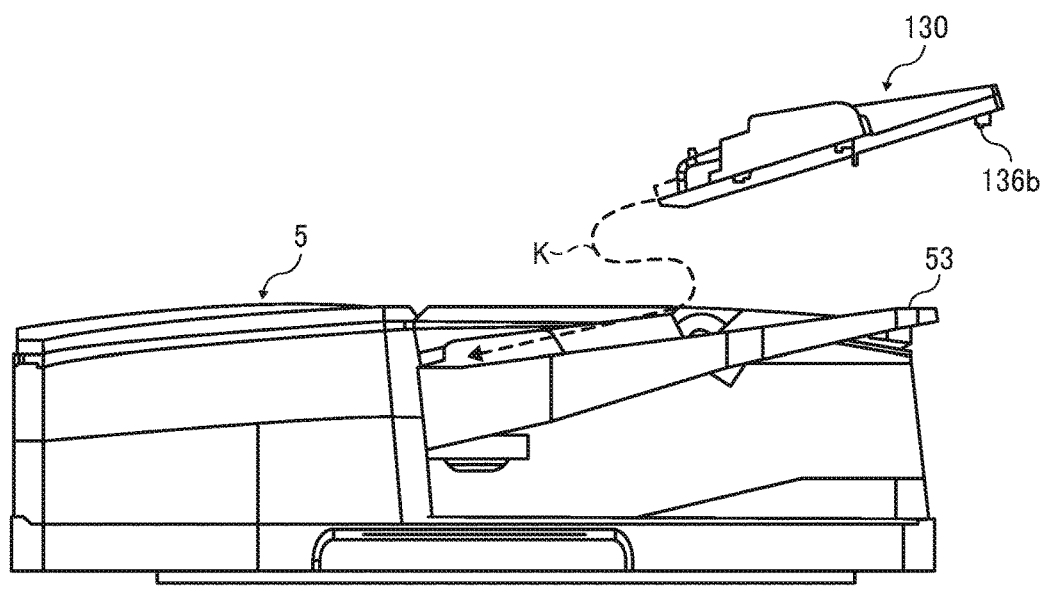
FIGS. 13A and 13B are diagrams that illustrate an appearance in which a sheet feeding sub tray is installed in a document loading stand.
Figure 13B:
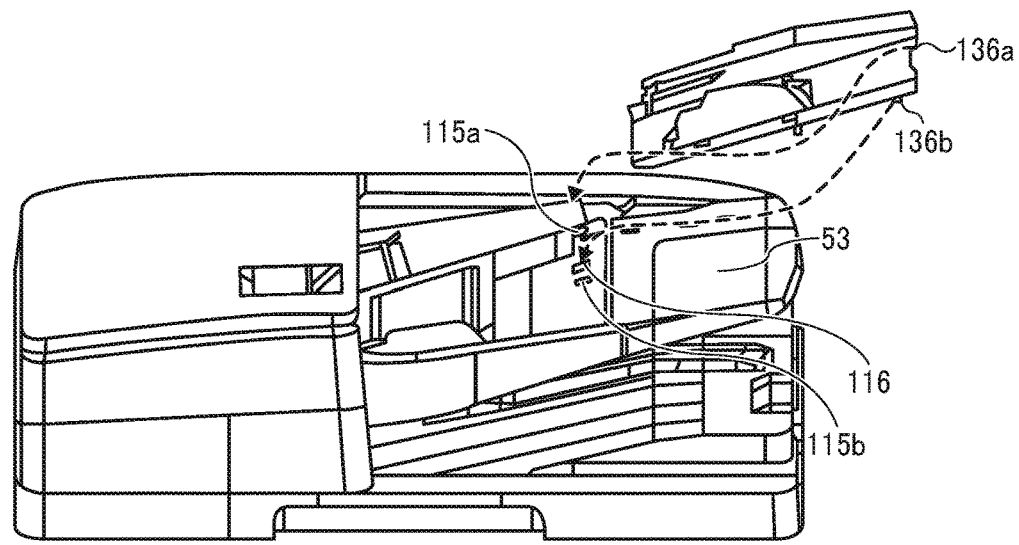

FIGS. 13A and 13B are diagrams that illustrate an appearance in which the sheet feeding sub tray 130 is installed in the document loading stand 53. FIG. 13A is a side view, and FIG. 13B is a perspective view.

As denoted by a dotted-line arrow K illustrated in FIG. 13A, the sheet feeding sub tray 130 is moved in the conveying direction, and the front end side of the sheet feeding sub tray 130 in the conveying direction is inserted into the inside of the automatic document feeder 5. More specifically, the sheet feeding sub tray 130 is inserted into the inside of the automatic document feeder 5 until the front end of the sheet feeding sub tray 130 abuts a wall part 5a (see FIGS. 10A and 10B) that is abutted by the front end of a document set on the document loading stand 53. Next, while an upstream-side end part of the sheet feeding sub tray 130 in the conveying direction is lowered, as illustrated in FIG. 13B, the first positioning projection 136a disposed near the upstream-side end part of the sheet feeding sub tray 130 in the conveying direction is inserted into the first positioning hole 115a of the document loading stand 53, and the second positioning projection 136b is inserted into the second positioning hole 115b. Accordingly, the sheet feeding sub tray 130 is positioned in the document loading stand 53. Then, when the upstream-side end part of the sheet feeding sub tray 130 in the conveying direction is lowered, and the sheet feeding sub tray 130 is installed in the document loading stand 53, the metal plate 137 is attracted to the fixing magnet 116, and the sheet feeding sub tray 130 is fixed to the document loading stand 53. In this way, by fixing the sheet feeding sub tray 130 to the document loading stand 53, it can be prevented that the sheet feeding sub tray 130 is dropped out from the document loading stand 53 when the automatic document feeder 5 is open for the scanner 4. In addition, a metal plate may be disposed in the document loading stand 53, and a fixing magnet may be disposed in the sheet feeding sub tray 130. In addition, in this embodiment, since the sheet feeding sub tray 130 is fixed to the document loading stand 53 using the magnet, the sheet feeding sub tray 130 can be easily detached from the document loading stand 53. In this way, switching from conveying of a small-size document to conveying of a document having a non-small-size document can be easily performed.

In addition, there are cases in which a small-size document that is conveyed by installing the sheet feeding sub tray 130 is an important document such as a check or a note. For this reason, in a case in which the sheet feeding sub tray 130 is installed, by configuring a document conveying speed to be lower than a general document conveying speed of a case in which the sheet feeding sub tray 130 is not installed, the document may be suppressed from being damaged.

Figure 14:
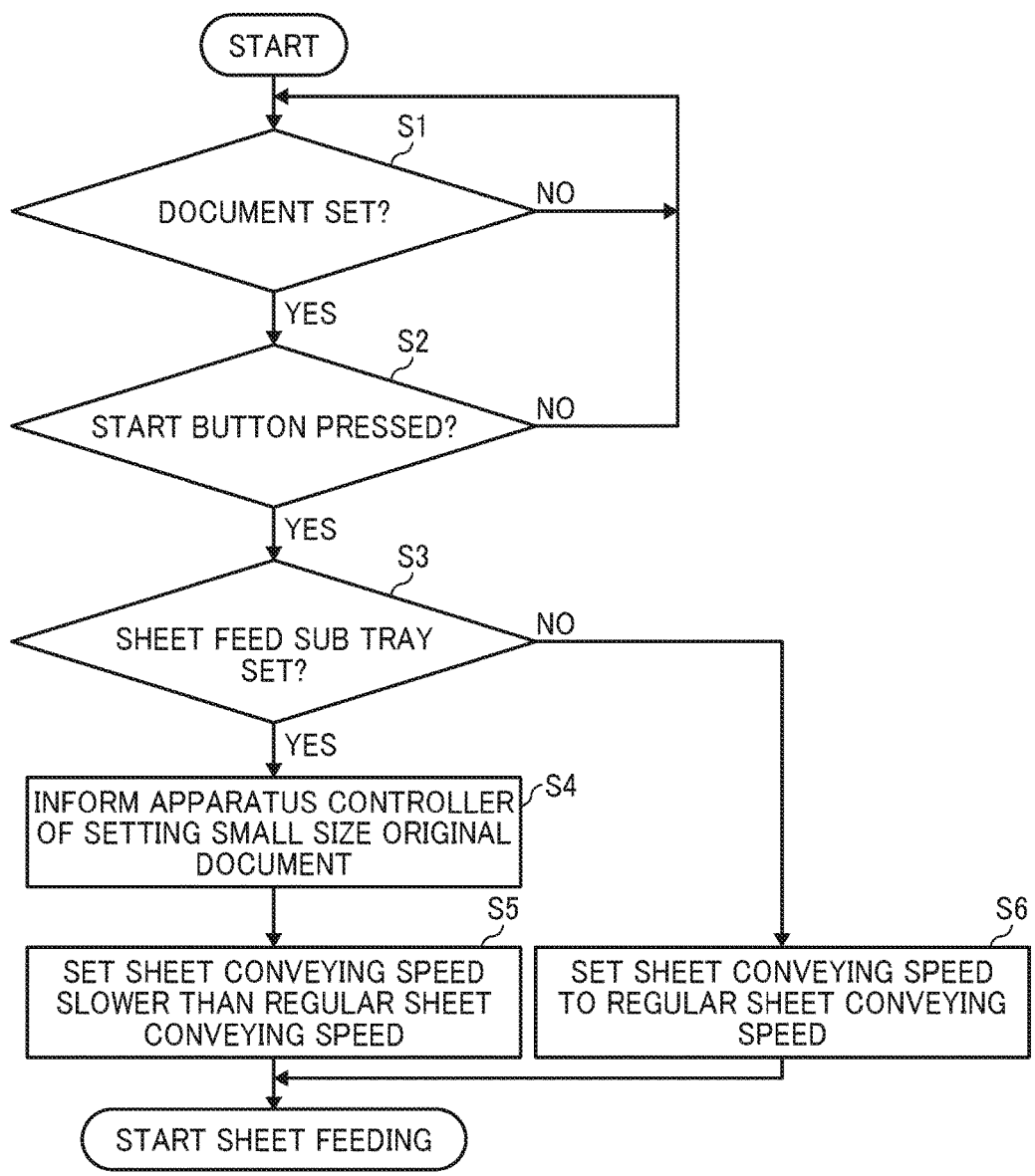
FIG. 14 is a flowchart of document conveying control.

FIG. 14 is a flowchart of document conveying control.

As illustrated in FIG. 14, in a state in which the document set sensor 63 detects a document (Yes in S1), when the pressing of the copy start button of the instruction input unit 108 is detected (Yes in S2), it is checked whether or not the sheet feeding sub tray 130 is installed (S3).

Whether or not the sheet feeding sub tray 130 is installed can be determined on a result of detection by disposing an installation detecting sensor detecting the installation of the sheet feeding sub tray 130 in the document loading stand 53. In addition, when the sheet feeding sub tray 130 is installed, it may be configured such that a user inputs information of installation of the sheet feeding sub tray 130 by operating the instruction input unit 108, and the installation of the sheet feeding sub tray 130 is detected on the basis of the input information.

In a case in which the sheet feeding sub tray 130 is installed (Yes in S3), a notification representing conveying of a small-size document is made for the apparatus controller 111 (the control unit of the main body of the copier 1). The apparatus controller 111, for example, performs the control of each device of the document feeding and reading unit 6 corresponding to the small-size document such as switching a reading mode of an image of the first face reader 40 to a reading mode corresponding to the small-size document (switches the mode to a small-size document mode).

In addition, the document conveying speed of the automatic document feeder 5 is set to a conveying speed slower than a general conveying speed (S5). Accordingly, the occurrence of a damage in a check, a note, or the like that is conveyed at the time of conveyance can be suppressed by installing the sheet feeding sub tray 130. On the other hand, in a case in which the sheet feeding sub tray 130 is not installed (No in S3), the general conveying speed is set (S6). In this way, a decrease in the reading speed of a document conveyed without using the sheet feeding sub tray 130 can be suppressed, and a decrease in the productivity can be suppressed.

In addition, a user may be allowed to select a general conveying speed or a conveying speed slower than the general conveying speed.

Figure 15:
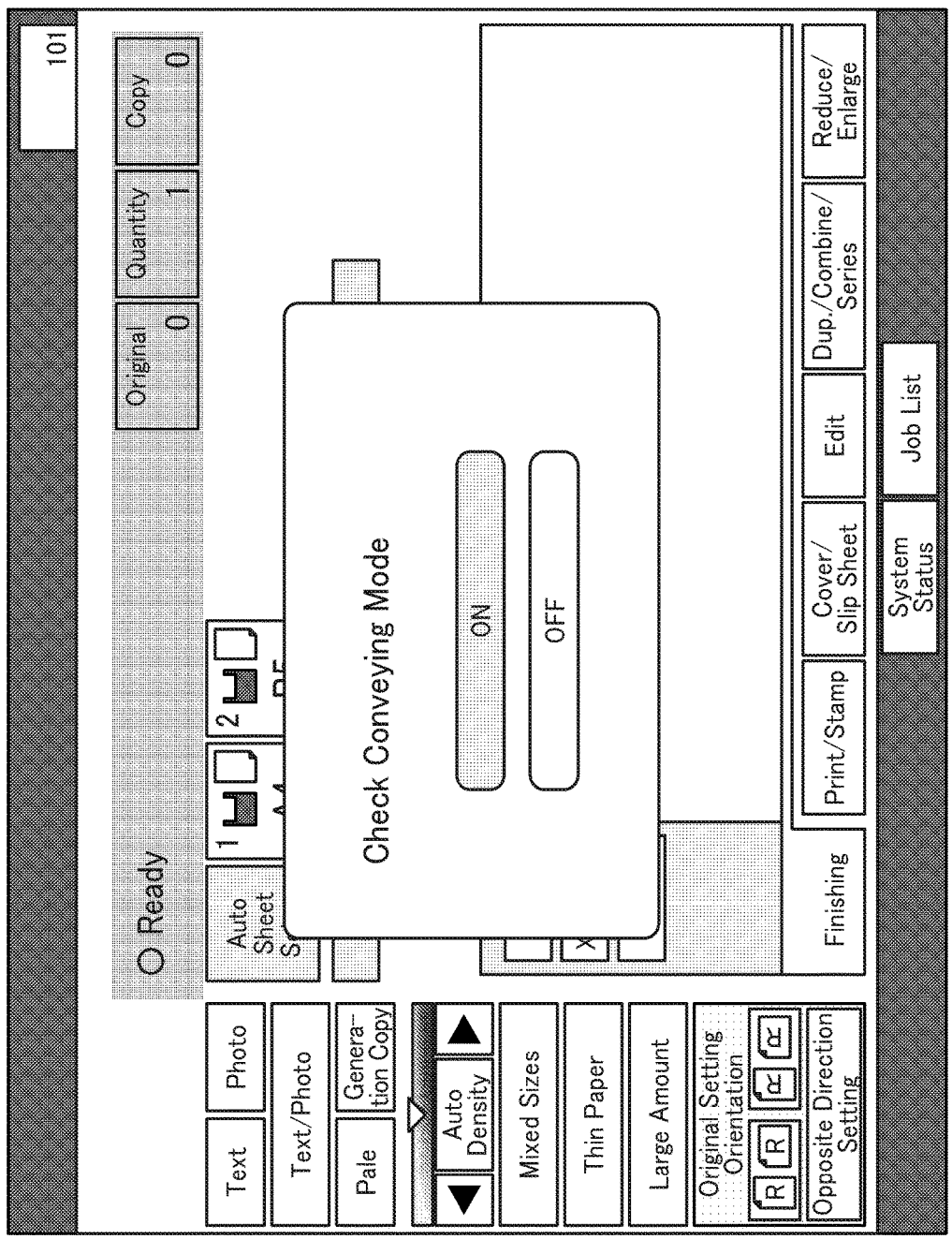
FIG. 15 is a diagram that illustrates one example of an image displayed in an image display of an instruction input unit when a document is conveyed in a case in which a sheet feeding sub tray is installed.

FIG. 15 is a diagram that illustrates one example of an image displayed on the image display of the instruction input unit 108 when a document is conveyed in a case in which the sheet feeding sub tray 130 is installed.

For example, in a state in which the sheet feeding sub tray 130 is installed, when the document set sensor 63 detects the setting of a document, the image illustrated in FIG. 15 is displayed on the image display. In a case in which the user selects "ON" on the basis of the image illustrated in FIG. 15, a small-size document set on the sheet feeding sub tray 130 is conveyed at a conveying speed lower than that of a general case. On the other hand, in a case in which the user selects "OFF" on the basis of the image illustrated in FIG. 15, a small-size document set on the sheet feeding sub tray 130 is conveyed at the general conveying speed. Accordingly, a small-size document that may be damaged more or less can be conveyed at the general conveying speed, and a decrease in the productivity can be suppressed.

In addition, skew may easily occur for a small-size document, and thus, there are cases in which the amount of skew is large. Accordingly, in the case of a small-size document, by causing the front end of the document to abut one pair of the pullout rollers 86, the abutting amount at the time of performing a skew correction may be larger than that of a general case.

Figure 16:
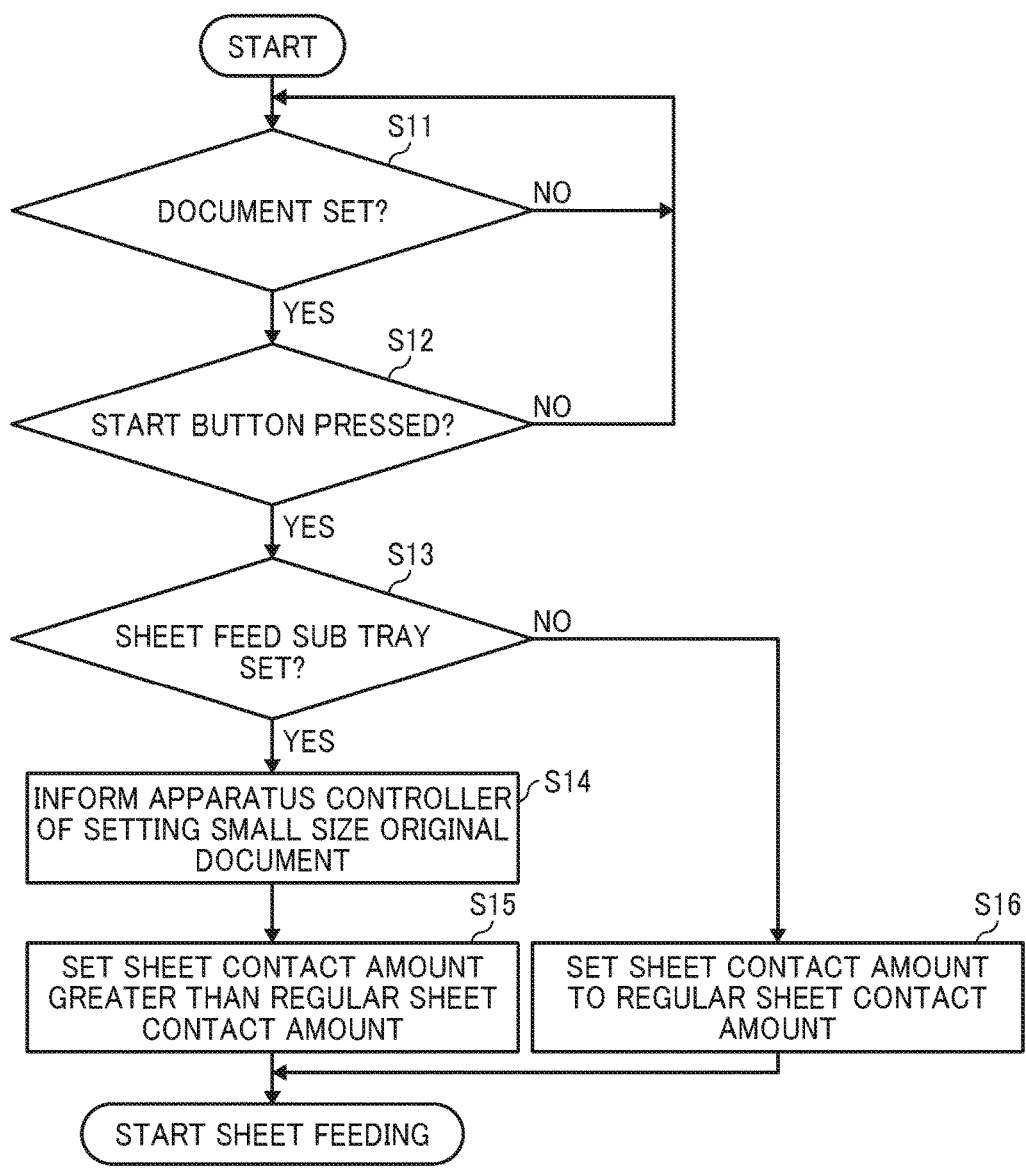
FIG. 16 is a flowchart of a skew operation.

FIG. 16 is a flowchart of a skew operation.

As illustrated in FIG. 16, in a case in which the sheet feeding sub tray 130 is installed (Yes in S13), conveying of a small-size document is notified to the apparatus controller 111, and the control of each device of the document feeding and reading unit 6 is switched to control corresponding to a small-size document (S14). In addition, the abutting amount of the document for the one pair of pullout rollers 86 is set to be larger than a general abutting amount (S15). More specifically, the driving time of the separation belt 84 after detection of the front end of the document using the document contact sensor 72 is set to be longer than a general driving time. In this way, the skew of a small-size document of which the amount of skew can be sufficiently corrected.

On the other hand, in a case in which the sheet feeding sub tray 130 is not installed (No in S13), the general abutting amount is set (S16). Accordingly, a stop time of the pullout roller 86 can be shorter than that at the time of conveying a small-size document, and therefore, a decrease in the productivity can be suppressed.

In addition, since skew may easily occur for a small-size document, it is preferable to perform a skew correction also before reading by causing the document to abut the reading entrance roller 97.

FIG. 17 is a flowchart of a skew operation before reading.

For example, in a case in which the document set sensor 63 detects document setting (Yes in S21), and the sheet feeding sub tray 130 is not installed, an image allowing a user to select whether to perform a skew correction before reading or not is displayed on the image display of the instruction input unit 108. The user selects whether or not a skew correction before reading is performed on the basis of the displayed image. The selected information is transmitted from the apparatus controller 111 to the controller 100. In addition, in the description presented above, although an example is illustrated in which a user is allowed to select whether or not a skew correction before reading is performed every time a document is set, for example, the user sets in advance whether or not a skew correction before reading is performed at the time of conveying a general document by operating the instruction input unit 108, and the setting information is stored in a memory. Then, at the time of conveying a general document, the setting information of the skew correction before reading stored in the memory may be read. In addition, it may be determined whether or not the skew correction is performed by using the sheet size like an example in which an abutting operation is determined based on whether or not the length of a document in the conveying direction is the size of B5 or less, and a skew correction before reading is not performed for a document of which the length of the document in the conveying direction is the size B5T or more.

When user's pressing of the copy start button of the instruction input unit 108 is detected (Yes in S22), it is checked whether or not the sheet feeding sub tray 130 is installed (S23). In a case in which the sheet feeding sub tray 130 is not installed (No in S23), it is checked whether or not a direction for a skew correction before reading is present (S23). In a case in which a direction for a skew correction before reading is not present (No in S25), no skew correction before reading is set (S27), and sheet feeding is started. Accordingly, at this time, the reading entrance roller 97 starts rotary driving before the arrival of the front end of the document and conveys the document to the reading position as it is. In this way, since the conveying of a document is not stopped by causing the front end of the document to abut the reading entrance roller 97, the productivity can be improved.

On the other hand, in a case in which the sheet feeding sub tray 130 is installed (Yes in S23) or in a case in which a direction for a skew correction before reading is present (Yes in S26), sheet feeding is started with setting the presence of a skew correction before reading (S26). Accordingly, in this case, the front end of the conveyed document abuts the reading entrance roller 97 to correct the skew. In addition, as described with reference to FIG. 16, the abutting amount at the time of conveying a small-size document may be larger than the abutting amount at the time of conveying a general document. In this way, the small-size document can be conveyed to the reading position in a state in which skew is suppressed, and an image of the small-size document can be satisfactorily read. In addition, also for a document having a general size, by performing a skew correction before reading, an image of the document can be satisfactorily read.

The description presented above is one example, and a unique effect is acquired for each of the following aspects.

(Aspect 1)

There is provided a sheet feeding sub tray 130 that can be detachably attached to a sheet loading stand of a sheet conveying device such as the automatic document feeder 5 including a setting reference part such as the setting reference face 112 on one end side of the sheet loading stand such as the document loading stand 53 in a sheet width direction, the sheet feeding sub tray including the small-size setting reference face 132 positioned on a further center side in the sheet width direction than the setting reference part when being installed in the sheet loading stand.

According to this, by installing the sheet feeding sub tray 130 in a sheet loading stand of the sheet conveying device such as the automatic document feeder 5, the setting reference part is changed to a further center side in the sheet width direction than before the installation of the sheet feeding sub tray. Accordingly, by setting a small size sheet, of which the other end in the width direction does not reach a position facing the sheet feeding roller when one end in the width direction is set to abut the setting reference part of the sheet conveying device, to abut the small-size setting reference part of the sheet feeding sub tray installed in the sheet loading stand, the small-size sheet can be located at a position facing the sheet feeding roller. As a result, a small-size sheet that cannot be conveyed by the sheet conveying device can be conveyed.

(Aspect 2)

In Aspect 1, a small-size sheet loading stand such as the bottom plate 135 is further included, and the small-size sheet loading stand is able to load only a small-size sheet. Here, the small-size sheet is a sheet having a size smaller than a sheet having a minimum size that can be conveyed by the sheet conveying device.

Accordingly, it can be determined whether or not a sheet such as a small-size document is conveyed based on whether or the sheet feeding sub tray 130 is installed in the sheet loading stand such as the document loading stand 53.

(Aspect 3)

In Aspect 2, small-size side fences 131 that are disposed to be slidable in the sheet width direction with respect to the small-size sheet loading stand such as the bottom plate 135 and position an end part of the small-size sheet such as a small-size document Ss set on the small-size sheet loading stand on a side opposite to a small-size setting reference part-side end part are disposed.

According to this, as described in the embodiment, it can be prevented that a sheet other than the small-size sheet is set on the small-size sheet loading stand such as the bottom plate 135 by the small-size side fences 131.

(Aspect 4)

In Aspect 2 or 3, a setting detector such as the small-size setting detecting mechanism 134 that detects setting of the small-size sheet such as the small-size document Ss in the small-size sheet loading stand such as the bottom plate 135 is further included.

According to this, it can be detected that the small-size sheet is set on the sheet feeding sub tray 130.

(Aspect 5)

In Aspect 4, the setting detector such as the small-size setting detecting mechanism 134 detects that the small-size sheet is set on the small-size sheet loading stand such as the bottom plate 135 when a front end of the small-size sheet is positioned on a further downstream side in a sheet conveying direction than a sheet feeding roller such as the pickup roller 80 of the sheet conveying device such as the automatic document feeder 5.

According to this, as described in the embodiment, the sheet feeding roller such as the pickup roller 80 can be brought into contact with the small-size sheet set on the small-size sheet loading stand such as the bottom plate 135 at the time of conveying the sheet, and the small-size sheet can be fed by the sheet feeding roller.

(Aspect 6)

In any one of Aspects 2 to 5, the small-size setting reference part is disposed such that, when the small-size sheet is set by causing the small-size sheet to abut the small-size setting reference part such as the small-size setting reference face 132, an end part of the small-size sheet that is disposed on a side opposite to the small-size setting reference part is positioned on a further separate side from the small-size setting reference part than an end part of a conveying member having a largest width on a side opposite to the small-size setting reference part among a plurality of conveying members (the pickup roller 80, the separation belt 84, the center pullout conveying roller 86b, and the like) having a largest conveying member among a plurality of conveying members of the sheet conveying device that convey the small-size sheet with being brought into contact with the small-size sheet.

According to this, as described in the embodiment, a conveying member of the sheet conveying device that conveys the small-size sheet with being brought into contact with the small-size sheet is not in contact with the end part of the small-size sheet, and accordingly, the occurrence of edge folding and the like in the small-size sheet can be suppressed.

(Aspect 7)

In a sheet conveying device such as the automatic document feeder 5 including a sheet loading stand such as the document loading stand 53 including a setting reference part such as the setting reference face 112 on one end side in a sheet width direction, the sheet feeding sub tray 130 according to any one of Aspects 1 to 6 can be installed in the sheet loading stand.

Accordingly, a small-size sheet that cannot be conveyed can be conveyed.

(Aspect 8)

In Aspect 7, a conveying roller (in this embodiment, the intermediate roller 66, the reading entrance roller 97, the reading exit roller 92, the second reading exit roller 93, and the document ejecting roller 94) arranged on a further downstream side in a sheet conveying direction than a sheet feeding roller such as the pickup roller 80 is configured such that a small-size sheet set on the sheet feeding sub tray 130 is conveyed by a plurality of conveying rollers on a further downstream side in the sheet conveying direction than the sheet feeding roller, and conveying forces of a plurality of conveying rollers conveying the small-size sheet set on the sheet feeding sub tray are weaker than conveying forces of conveying rollers arranged on a same axis as that of the plurality of conveying rollers.

According to this embodiment, as described above, a small-size sheet and a general sheet that can be conveyed without the sheet feeding sub tray 130 can be stably conveyed.

(Aspect 9)

In Aspect 7 or 8, a sheet conveying speed when the sheet feeding sub tray 130 is installed is slower than a sheet conveying speed when the sheet feeding sub tray is not installed.

According to this, as described above, a damage in the small-size sheet according to conveying can be suppressed.

(Aspect 10)

In Aspect 7 or 8, a user is allowed to select to decrease a sheet conveying speed or not when the sheet feeding sub tray 130 is installed.

According to this, for a small-size document that may be damaged more or less, the conveying speed is increased, whereby the productivity can be improved. On the other hand, for a small-size sheet in which the occurrence of damage is desired to be suppressed, the conveying speed is decreased, whereby the occurrence of damage in the sheet can be suppressed.

(Aspect 11)

In any one of Aspects 7 to 10, a skew correcting unit (in this embodiment, configured by the pullout roller 86 and the like) that corrects skew of a sheet by abutting a front end of the conveying sheet in a conveying direction is included, and the skew correction using the skew correcting unit is performed when the sheet feeding sub tray 130 is installed.

According to this, as described in the embodiment descried above, skew of the small-size sheet occurring at the time of conveying can be corrected.

(Aspect 12)

In Aspect 11, an abutting amount of the skew correcting unit abutting the front end of the sheet when the sheet feeding sub tray 130 is installed is larger than an abutting amount when the sheet feeding sub tray is not installed.

According to this, as described in the embodiment, for a small-size sheet for which skew may easily occur and the amount of skew at the time of conveying is larger than a general sheet that can be conveyed without the sheet feeding sub tray 130, a skew correction can be satisfactorily performed. On the other hand, for a general sheet that can be conveyed without the sheet feeding sub tray 130, by decreasing the abutting amount, a time required for a skew correction can be shorter than that of the small-size sheet, and accordingly, a decrease in the productivity can be suppressed.

(Aspect 13)

In an image reading device such as the document feeding and reading unit 6 including: a document conveying unit such as the automatic document feeder 5 conveying a document sheet having a document image on a front face; and a conveying document reader such as the fixed image reader 500 reading the document image of the document sheet conveyed by the document conveying unit, the sheet conveying device according to any one of Aspects 7 to 12 is used as the document conveying unit.

According to this, a small-size document can be also conveyed, and a document image included in the small-size document can be read.

(Aspect 14)

In an image forming apparatus such as the copier 1 including: an image reader such as the document feeding and reading unit 6; and an image forming device such as the image forming unit 3 forming an image on the basis of a document image read by the image reader, the image reading device according to Aspect 13 is included as the image reader.

According to this, an image of a small-size document can be copied.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A sheet feeding sub tray detachably attachable to a sheet loading stand of a sheet conveying device, the sheet conveying device including a setting reference part on one end side of the sheet loading stand in a sheet width direction and a side fence on an opposing end of the sheet loading stand in the sheet width direction that is slidable along a surface of the sheet loading stand in the sheet width direction, the sheet feeding sub tray comprising:
   a bottom plate in planar contact with a surface of the sheet loading stand between the setting reference part of the sheet loading stand and the side fence of the sheet loading stand;
   a small-size setting reference part disposed at a position closer to a center of the sheet loading stand in the sheet width direction than the setting reference part in a state in which the sheet feeding sub tray is installed to the sheet loading stand; and
   a small-sized side fence that is slidable in the sheet width direction on the bottom plate and disposed at a position closer to the center of the sheet loading stand in the sheet width direction than the side fence of the sheet loading stand.

2. The sheet feeding sub tray according to claim 1, further comprising:
   a small-size sheet loading stand to load only a small-size sheet.

3. The sheet feeding sub tray according to claim 2, wherein:
   the small-size side fence is slidable in the sheet width direction with respect to the small-size sheet loading stand and positions an end part of the small-size sheet set on the small-size sheet loading stand on a side opposite to a small-size setting reference part-side end part are disposed.

4. The sheet feeding sub tray according to claim 2, further comprising:
   a setting detector to detect setting of the small-size sheet in the small-size sheet loading stand.

5. The sheet feeding sub tray according to claim 4, wherein:
   the setting detector detects that the small-size sheet is set on the small-size sheet loading stand when a front end of the small-size sheet is positioned on a further downstream side in a sheet conveying direction than a sheet feeding roller of the sheet conveying device.

6. A sheet conveying device comprising:
   a sheet loading stand including a setting reference part on one end side in a sheet width direction,
   wherein the sheet feeding sub tray according to claim 1 is attachable to the sheet loading stand.

7. The sheet conveying device according to claim 6, wherein:
a sheet conveying speed when the sheet feeding sub tray is installed is slower than a sheet conveying speed when the sheet feeding sub tray is not installed.

8. The sheet conveying device according to claim 6, wherein:
a user is allowed to select to decrease a sheet conveying speed or not when the sheet feeding sub tray is installed.

9. The sheet conveying device according to claim 6, further comprising:
a skew correcting unit to correct skew of a sheet by abutting a front end of a conveying sheet in a conveying direction, wherein the skew correcting unit corrects the skew when the sheet feeding sub tray is installed.

10. The sheet conveying device according to claim 9, wherein:
an abutting amount of the skew correcting unit abutting the front end of the sheet when the sheet feeding sub tray is installed is larger than an abutting amount when the sheet feeding sub tray is not installed.

11. An image reading device comprising:
the sheet conveying device according to claim 6 to convey a document sheet having a document image on a front face; and
a conveying document reader to read the document image of the document sheet conveyed by the sheet conveying device.

12. An image forming apparatus comprising:
the image reading device according to claim 11 to read a document image; and
an image forming device to form an image based on the document image read by the image reading device.

13. The sheet feeding sub tray according to claim 1, wherein:
the setting reference part is fixed to the sheet loading stand.

14. The sheet feeding sub tray according to claim 1, wherein:
the small-sized setting reference part is fixed to the bottom plate.

15. A sheet feeding sub tray detachably attachable to a sheet loading stand of a sheet conveying device, the sheet conveying device including a setting reference part on one end side of the sheet loading stand in a sheet width direction, the sheet feeding sub tray comprising:
a small-size sheet loading stand to load only a small-size sheet; and
a small-size setting reference part disposed at a position closer to a center of the sheet loading stand in the sheet width direction than the setting reference part in a state in which the sheet feeding sub tray is installed to the sheet loading stand,
wherein the small-size setting reference part is disposed such that, when the small-size sheet is set by causing the small-size sheet to abut the small-size setting reference part, an end part of the small-size sheet that is disposed on a side opposite to the small-size setting reference part is positioned on a further separate side from the small-size setting reference part than an end part of a conveying member having a largest width on a side opposite to the small-size setting reference part among a plurality of conveying members having a largest conveying member among a plurality of conveying members of the sheet conveying device that convey the small-size sheet with being brought into contact with the small-size sheet.

16. A sheet conveying device comprising:
a sheet loading stand including a setting reference part on one end side in a sheet width direction, wherein a sheet feeding sub tray is attachable to the sheet loading stand, wherein a conveying roller arranged on a further downstream side in a sheet conveying direction than a sheet feeding roller is configured such that a small-size sheet set on the sheet feeding sub tray is conveyed by a plurality of conveying rollers on a further downstream side in the sheet conveying direction than the sheet feeding roller, and conveying forces of a plurality of conveying rollers conveying the small-size sheet set on the sheet feeding sub tray are weaker than conveying forces of conveying rollers arranged on a same axis as that of the plurality of conveying rollers,
the sheet feeding sub tray comprising a small-size setting reference part disposed at a position closer to a center of the sheet loading stand in the sheet width direction than the setting reference part in a state in which the sheet feeding sub tray is installed to the sheet loading stand.

* * * * *